United States Patent [19]
Nishikawa

[11] Patent Number: 6,097,514
[45] Date of Patent: *Aug. 1, 2000

[54] HOLOGRAM REPLICATING METHOD, AND VOLUME HOLOGRAM

[75] Inventor: Shingo Nishikawa, Tokyo, Japan

[73] Assignee: Dai Nippon Printing Co., Ltd., Tokyo, Japan

[*] Notice: This patent is subject to a terminal disclaimer.

[21] Appl. No.: 09/063,424

[22] Filed: Apr. 20, 1998

Related U.S. Application Data

[63] Continuation-in-part of application No. 08/895,322, Jul. 16, 1997.

[30]   Foreign Application Priority Data

| Jul. 31, 1996 | [JP] | Japan | 8-201770 |
| Sep. 25, 1996 | [JP] | Japan | 8-253270 |
| Apr. 9, 1997 | [JP] | Japan | 9-090738 |

[51] Int. Cl.[7] ............... G03H 1/20; G03H 1/28
[52] U.S. Cl. ............... 359/12; 359/24; 359/28; 430/1; 430/2
[58] Field of Search ............... 359/120, 22, 24, 359/28, 33; 430/1, 2; 355/2

[56]    References Cited

U.S. PATENT DOCUMENTS

| 4,416,505 | 11/1983 | Dickson | 359/12 |
| 4,575,192 | 3/1986 | Duthie et al. | 359/12 |
| 4,720,158 | 1/1988 | Kuwayama et al. | 359/12 |
| 4,904,033 | 2/1990 | Ikeda et al. | 359/12 |
| 4,968,108 | 11/1990 | Ikeda et al. | 359/32 |
| 5,016,953 | 5/1991 | Moss et al. | 359/12 |
| 5,499,118 | 3/1996 | Wreede et al. | 359/22 |

Primary Examiner—Jon Henry
Attorney, Agent, or Firm—Dellett and Walters

[57]    ABSTRACT

The invention relates to a method for replicating a volume hologram having an image of a scattering object recorded therein according to a hologram replicating technique, wherein the diffraction 13 of unnecessary light due to zero-order light, etc. arising from regular reflection and a visual range capable of viewing a recorded image is limited to a desired range α, so that the image can be displayed more brightly than would be possible with the original hologram plate, and a volume hologram as well. When replicating a volume hologram 4' having an image O' of a scattering body recorded therein, replicating illumination light is incident on the volume hologram 4' at an angle of incidence $I_1$ at which a group of fringes can be replicated and recorded, said group of fringes being such that, in the vicinity of an apex defined by a supposed slant angle $S_g$ at which a replicated hologram 4' can be viewed at a supposed viewing center angle φ within a range α upon illumination with illumination light 7 at a supposed illumination angle θ, a recording degree of said group of fringes becomes weaker at a position farther away from said slant angle $S_g$.

8 Claims, 15 Drawing Sheets

- 71 Liquid crystal panel
- 72 Index-matching liquid
- 73 Reflection type diffuse hologram

- 71a Polarizing plate
- 71b Electrode layer
- 71c Liquid crystal layer
- 71d Electrode layer
- 71e Polarizing plate Photographic material 73
Reflection diffuse plate 74
76 Diffusing plate
75 Incident light
77 Reference light 73 Reflection type diffuse hologram
78 Reflected and diffracted light
77 Reference light 80 Transmission hologram
81 Liquid crystal panel
82 Mirror reflection plate

HOLOGRAM REPLICATING METHOD, AND VOLUME HOLOGRAM

This is a continuation-in-part of copending application Ser. No. 08/895,322, filed on Jul. 16, 1997.

BACKGROUND OF THE INVENTION

The present invention relates generally to a hologram-replicating (or copying) method and a volume hologram, and more particularly to a method for replicating (or copying) a volume hologram having an image of a scattering object recorded therein by a hologram replicating technique, wherein the diffraction of unnecessary light (zero-order light) is limited and a visual range (angle-of-view range) where the recorded image can be viewed is limited to a desired range, so that an image brighter than that in the original hologram plate can be displayed, and a volume hologram.

So far, it has been well known in the art that scattering light coming from a scattering object and reference light interfere in a volume hologram photographic material to record a volume hologram reconstructible in white illumination light. Also well known in the art is a hologram replicating technique wherein a reflection or transmission type volume hologram is provided thereon with another volume hologram photographic material, and laser light is allowed to be incident on said another photographic material or the original hologram plate so that said incident light and light diffracted by the volume hologram can interfere in said another photographic material, whereby the original volume hologram can be copied to obtain the same hologram.

When copying a volume hologram with a scattering object recorded therein by the hologram replicating technique, however, the angle of incidence of the copying laser light has been selected from those in the vicinity of the angle of incidence of the reference light used for recording the original hologram plate or otherwise no special care has been taken thereof at all. For this reason some problems have arisen. For instance, unnecessary interference fringes coming from light (zero-order light) produced by the regular reflection of light from the scattering object remain recorded in the copied hologram, or unnecessary diffracted light arises from unnecessary interference fringes because the visual range where the recorded image can be viewed is as wide as that of the original hologram plate. Consequently, no satisfactorily bright display can be obtained.

SUMMARY OF THE INVENTION

In view of such problems with the prior art, an object of the present invention is to provide a method for replicating a volume hologram with an image of a scattering object recorded therein by the hologram replicating technique, wherein the diffraction of unnecessary light due to zero-order light, etc. arising from regular reflection is limited and a visual range where the recorded image can be viewed is limited to a desired range, thereby obtaining a hologram capable of presenting an image display brighter than would be possible with the original hologram plate, and a volume hologram.

Another object of the present invention is to provide a hologram display piece that is one volume hologram which has an image of a scattering body recorded therein, and to which the aforesaid hologram replicating method is applied, and a process for fabricating the same.

Yet another object of the present invention is to provide a hologram liquid crystal display timepiece comprising a reflection type diffuse hologram layer that is a volume hologram which has an image of a scattering body recorded therein, and to which the aforesaid hologram replicating method is applied.

According to one aspect of the present invention, there is provided a method for replicating an original volume hologram plate having an image of a scattering body recorded therein according to a hologram replicating technique, characterized in that replicating illumination light is incident on said original volume hologram-plate at an angle of incidence $I_1$ at which a group of fringes can be replicated and recorded, said group of fringes being such that, in the vicinity of an apex defined by a supposed slant angle $S_g$ at which a replicated hologram can be viewed at a supposed viewing center angle $\phi$ upon illuminated at a supposed illumination angle $\theta$, the recording degree of said group of fringes becomes weaker at a position farther away from the slant angle $S_g$.

Preferably in this case, the angle of incidence $I_1$ should satisfy:

$$I_1 = \sin^{-1}\langle n_1/n_0 \times \sin(\pm\cos^{-1}[\lambda_1/(v_0\lambda_0) \times \\ \cos\{\sin^{-1}(n_0/n_1 \times \sin I_0) - \{\sin^{-1}(n_0/n_1 \times \sin\theta) + \\ \sin^{-1}(n_0/n_1 \times \sin\phi)\}/2 - \tau_0\}] + \{\sin^{-1}(n_0/n_1 \times \sin\phi) + \\ \sin^{-1}(n_0/n_1 \times \sin\theta)\}/2 - \tau_1 \rangle \quad (6)$$

wherein:

$I_0$ is an angle of incidence of reference light to record said original volume hologram plate, $\lambda_0$ is an wavelength at which the original volume hologram plate is recorded, $v_0$ is a degree of shrinkage of a photographic material with the original volume hologram plate recorded therein, $\tau_0$ is a slant angle change of fringes recorded in the original volume hologram plate, $\lambda_1$ is a wavelength to replicate the original volume hologram plate, $\tau_1$ is a slant angle change of replicated fringes, $n_0$ is an external refractive index of the photographic material, and $n_1$ is an internal refractive index of the photographic material.

According to another aspect of the present invention, there is provided a method for replicating an original volume hologram plate with a first volume hologram having an image of a first scattering body recorded therein and a second volume hologram having an image of a second scattering body recorded therein, said holograms superposed on each other, in a single volume hologram photographic material according to claim 1 or 2, characterized in that replicating illumination light is incident on the original volume hologram plate at an angle of incidence $I_1$ at which a first group of fringes, a second group of fringes, and at least one additional similar group of fringe can be replicated and recorded, said first group of fringes being such that, in the vicinity of an apex defined by a first supposed slant angle $S_{g1}$ at which a replicated hologram can be viewed at a first supposed viewing center angle $\phi_1$ upon illuminated at a supposed illumination angle $\theta$ with respect to the hologram image of the first scattering object, a recording degree of said first group of fringes becomes weaker at a position farther away from the slant angle $S_{g1}$, and said second group of fringes being such that, in the vicinity of an apex defined by a second supposed slant angle $S_{g2}$ at which the replicated hologram can be viewed at a second supposed viewing center angle $\phi_2$ different from the first supposed viewing center angle $\phi_1$ upon illuminated at the supposed illumination angle $\theta$ with respect to the hologram image of the second scattering object, a recording degree of said second group of fringes becomes weaker at a position farther away from the slant angle $S_{g2}$.

According to yet another aspect of the present invention, there is provided a method for replicating an original volume hologram plate with a first volume hologram having an image of a first scattering body recorded therein at a first wavelength and a second volume hologram having an image of a second scattering body recorded therein at a second wavelength, said holograms superposed on each other, in a single volume hologram photographic material according to claim 1 or 2, characterized in that replicating illumination light is incident on the original volume hologram plate at an angle of incidence $I_1$ at which a first group of fringes, a second group of fringes, and at least one similar group of fringes can be replicated and recorded, said first group of fringes being such that, in the vicinity of an apex defined by a first supposed slant angle $S_g$ at which a replicated hologram can be viewed at a supposed viewing center angle $\phi$ upon illuminated at a supposed illumination angle $\theta$ with respect to the hologram image of the first scattering body using third illumination light having a constant wavelength ratio relation to the first wavelength, a recording degree of said first group of fringes becomes weaker at a position farther away from the slant angle $S_g$, and said second group of fringes being such that, in the vicinity of an apex defined by the same supposed slant angle $S_g$ at which the replicated hologram can be viewed at the same second supposed viewing center angle $\phi$ upon illuminated at a supposed illumination angle $\theta$ with respect to the hologram image of the second scattering object using fourth illumination light having again a constant wavelength ratio relation to the second wavelength, a recording degree of said second group of fringes becomes weaker at a position farther away from the same slant angle $S_g$.

According to a further aspect of the invention, there is a method for replicating a volume hologram with an image of a scattering body recorded therein by a two-stage hologram replicating process, characterized in that:

a hologram replicated at a first stage is illuminated with a given component $\theta_x$ of supposed illumination angle in one direction of two directions perpendicular to a surface of said hologram and replicating illumination light is incident on said hologram at an angle of incidence $I_{1x}$ at which a fringe can be recorded by replication, said fringe having a supposed slant angle $S_{gx}$ at which said hologram can be observed at a given component $\phi_x$ of supposed observation center angle, and a hologram replicated at a second stage is illuminated with a given component $\theta_y$ of supposed illumination angle in the other direction of two directions perpendicular to the surface of said hologram and replicating illumination light is incident on said hologram at an angle of incidence $I_{1y}$ at which a fringe can be recorded by replication, said fringe having a supposed slant angle $S_{gy}$ at which said hologram can be observed at a given component $\phi_y$ of supposed observation center angle.

The present invention also includes a volume hologram fabricated by any one of the aforesaid fabrication methods.

According to a further aspect of the present invention there is provided a volume hologram having an image of a scattering body recorded therein, characterized in that recorded therein is only a group of fringes lying at slant angles in a given width $\Delta S$ with respect to a slant angle $S_g$ at which a fringe can be viewed at a given viewing center angle $\phi$ upon illuminated at a given illumination angle $\theta$.

According to a further aspect of the present invention, there is provided a volume hologram having an image of a scattering body recorded therein, characterized in that recorded therein are a first group of fringes lying at slant angles in a given width $\Delta S_1$ with respect to a slant angle $S_{g1}$ at which a fringe can be viewed at a given viewing center angle $\phi_1$ upon illuminated at a given angle $\theta$, a second group of fringes lying at slant angles in a given width $\Delta S_2$ with respect to another slant angle $S_{g2}$ at which a fringe can be viewed at another viewing center angle $\phi_2$ upon illuminated at said given illumination angle $\theta$, and at least one additional similar group of fringes.

According to a further aspect of the present invention, there is provided a volume hologram having an image of a scattering body recorded therein, characterized in that recorded therein a first group of fringes lying at slant angles in a given width $\Delta S_1$ with respect to a slant angle $S_g$ at which a fringe can be viewed at a given viewing center angle $\phi$ upon illuminated with illumination light of a first wavelength at a given angle $\theta$, a second group of fringes lying at slant angles in a given width $\Delta S_2$ with respect to the slant angle $S_g$ at which a fringe can be viewed at the same viewing center angle $\phi$ upon illuminated with illumination light of a second wavelength at the same given illumination angle $\theta$, and at least one additional similar group of fringes.

Preferably in these aspects, the hologram image should be recorded in such a manner that it is reconstructed in the vicinity of a hologram surface.

The hologram replicating method of the present invention provides a replicated hologram which can display a hologram image more brighter than would be possible with the original hologram plate because the diffraction of unnecessary light due to zero-order light, etc., arising from regular reflection is limited and the visual range capable of viewing a recorded image is limited to a desired range. This feature of the present invention is due to the fact that replicating illumination light is incident on the original hologram plate at an angle of incidence $I_1$ at which a group of fringes can be replicated and recorded, said group of fringes being such that, in the vicinity of an apex defined by a supposed slant angle $S_g$ at which the replicated hologram can be viewed at a supposed viewing center angle $\phi$ upon illuminated at a supposed illumination angle $\theta$, the recording degree of said group of fringes becomes weaker at a position farther away from said slant angle $S_g$.

According to a further aspect of the present invention, there is provided a combined reflection and volume phase type of hologram display piece, characterized in that a virtual opening and a fine pattern are recorded with a spatial distance therebetween in a reconstructible manner so that the fine pattern located behind the virtual opening can be seen through the virtual opening.

According to a further aspect of the present invention, there is provided a combined reflection and volume phase type of hologram display piece, characterized in that a fine pattern provides a non-diffraction area within a hologram surface, and a virtual opening is recorded at a spatial distance from the hologram surface in a reconstructible manner so that the non-diffraction area located behind the virtual opening can be visually discriminated through the virtual opening from a diffraction area.

Preferably in these aspects, a position where the virtual opening is reconstructed should be a surface in the vicinity of the hologram surface.

According to a further aspect of the present invention, there is provided a method for fabricating a hologram display piece, characterized by comprising steps of:

irradiating and deactivating an area of a first volume phase type hologram photographic material layer with light while leaving intact other area of the photographic material layer corresponding to a virtual opening pattern, allowing light to be incidence on the partially deactivated area of the first volume phase type hologram photographic material layer so that the incident light, and scattering light that is transmitted through the first volume phase type hologram photographic material layer and reflected from a reflecting scatter surface located on an opposite side of the first volume phase type hologram photographic material layer interfere in the intact pattern area of the first volume phase type hologram photographic material layer to create an original reflection hologram plate, irradiating and deactivating a fine pattern area of a second volume phase hologram photographic material layer corresponding to a fine pattern with light, and allowing light to be incident on the partially deactivated second volume phase type hologram photographic material layer that is located on the original reflection hologram plate at a distance therefrom, so that the incident light, and light that is transmitted through the second volume phase type hologram photographic material layer and reflected and diffracted by the original reflection hologram plate interfere in a non-deactivated area of the second volume phase type hologram photographic material layer to create a reflection hologram.

According to a further aspect of the present invention, there is provided a method for fabricating a hologram display piece, characterized by comprising steps of:

irradiating and deactivating an area of a first volume phase type hologram photographic material layer with light while leaving intact other area of the photographic material layer corresponding to a virtual opening pattern, allowing light to be incidence on the partially deactivated area of the first volume phase type hologram photographic material layer so that the incident light, and scattering light that is transmitted through the first volume phase type hologram photographic material layer and reflected from a reflecting scatter surface provided on an incidence side with an absorptive pattern corresponding to a fine pattern interfere in a non-deactivated pattern area of the first volume phase type hologram photographic material layer to create an original reflection hologram plate, and allowing light to be incident on a second volume phase type hologram photographic material layer that is located on the original reflection hologram plate at a distance therefrom, so that the incident light, and light that is transmitted through the second volume phase type hologram photographic material layer and reflected and diffracted by the original reflection hologram plate located on an opposite side thereof interfere in a non-deactivated area of the second volume phase type hologram photographic material layer to create a reflection hologram.

It is understood that the present invention also includes hologram display pieces fabricated by these fabrication methods.

The hologram display piece of the present invention, and the method for fabricating the same enables a fine pattern located behind a small virtual opening like a keyhole to be seen through the virtual opening. Between the virtual opening and the fine pattern there is so a certain distance that the fine pattern seen through and behind the virtual opening can move and change upon the movement of the observer's visual point. Such action makes it possible to obtain a display piece that is difficult to forge and can easily pass judgment on whether an article having it attached thereto is true or not.

According to a further aspect of the present invention, there is provided a hologram liquid crystal display timepiece, characterized in that a reflection type diffuse hologram layer is located on a back side of a liquid crystal panel, said reflection type diffuse hologram layer has a lateral offset function so as to be free of regularly reflected light.

According to a further aspect of the present invention, there is provided a hologram liquid crystal display timepiece, characterized in that a transmission type diffuse hologram layer is located on a front surface of a liquid crystal panel and a reflecting layer is located on a back surface thereof, said transmission type diffuse hologram layer has a lateral offset function so as to be free of regularly reflected light.

According to the hologram liquid crystal display timepiece of the present invention, visibility can be improved because the reflection type diffuse hologram is disposed on the back surface of the liquid crystal panel or the transmission type diffuse hologram is disposed on the front surface of the liquid crystal panel, and each hologram has a lateral offset function so as to be free of light produced by the regular reflection of ambient light. A variety of aesthetic effects can also be achieved by recording logotype marks or various patterns in the holograms.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

In the first place, the principles of the hologram replicating method, and volume hologram according to the present invention will be explained with some embodiments shown in the accompanying drawings.

Now consider the replication of a hologram by recording a scattering object in the form of a volume hologram to be used as the original hologram plate (hereinafter often called the original plate), and then superposing another recording material on the original plate.

Figure 1:
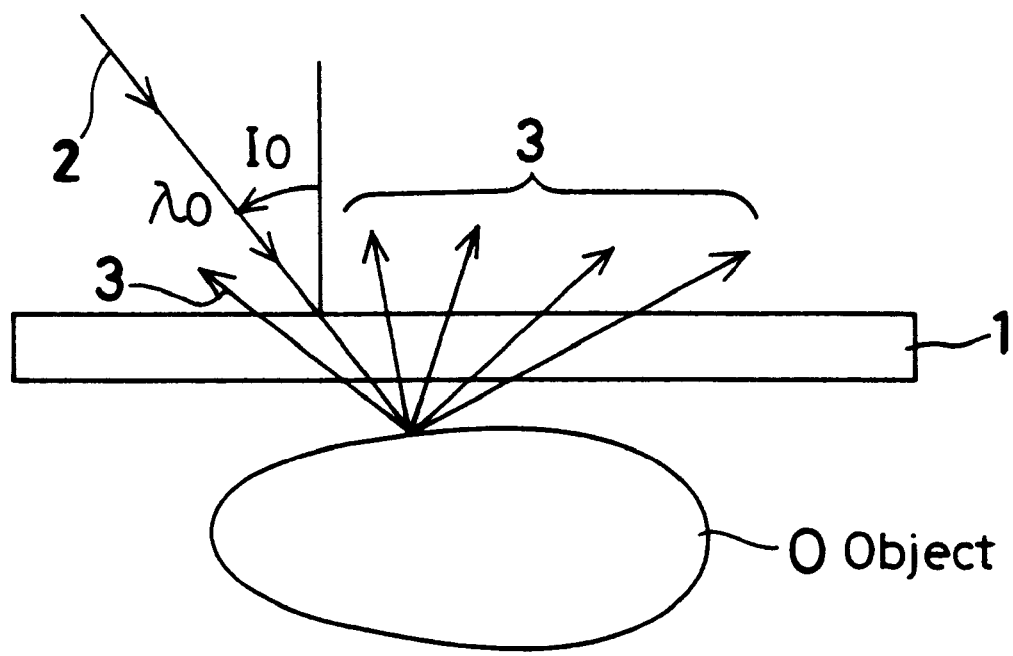
FIG. 1 is a schematic illustrative of how to record an original volume hologram.

As shown in FIG. 1, illumination light 2 strikes an object O. Scattered light 3 coming from the object O and a portion of the illumination light 2 that acts as reference light interfere in a volume hologram photographic material 1 so that the original hologram plate can be recorded. In this case, the object O may be illuminated by, rather than zero-order light 2 upon passing through the volume hologram photographic material 1, split light separate from such light 2. Herein, let $I_0$ and $\lambda_0$ denote the angle of incidence, and wavelength of the reference light 2 used to record the original plate, respectively.

Further, let $\nu_0$ denote the degree of shrinkage, due to post treatments of the original plate, of the volume hologram photographic material 1 with the original hologram recorded therein, and $\tau_0$ denote a change in the slant angle of (interference) fringes recorded therein. The "slant angle" is here understood to refer to an angle of the normal of the fringe surface with the normal of the surface of the volume hologram photographic material 1.

Figure 2:
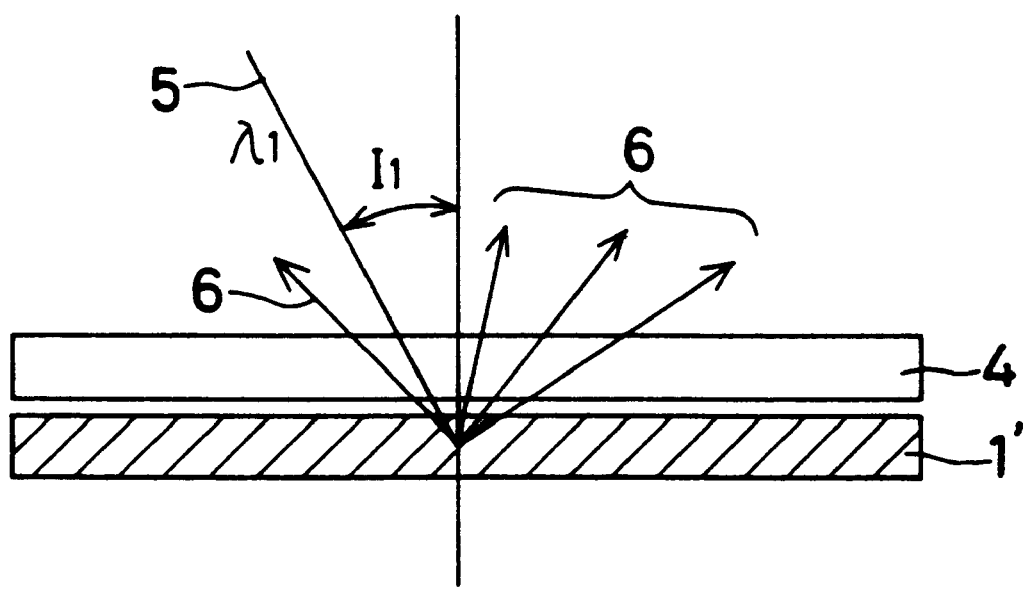
FIG. 2 is a schematic illustrative of how to replicate or copy a hologram from the original volume hologram according to the present invention.

As shown in FIG. 2, another volume hologram photographic material 4 is brought in close contact with an original plate 1' recorded and post-treated as shown in FIG. 1, or alternatively superposed on that original plate with a slight gap therebetween. Then, illumination light 5 of wavelength $\lambda_1$ strikes a volume hologram photographic material 4 at an angle $I_1$ of incidence, so that the incident light 5 and diffracted light 6 diffracted by the original plate 1' can interfere in the volume hologram photosensitive material 4 for hologram replicating purposes. It is noted that if the original plate 1' is of the transmission type, the illumination light 5 must then be incident on the original plate 1'.

Again, let $\nu_1$ denote the degree of shrinkage, due to post-treatments, of the volume hologram photographic material 4 with the hologram replicated, and $\tau_1$ denote a change in the slant angle of fringes recorded therein.

Also, let $n_1$ and $n_0$ be the average refractive index, and external refractive index of the volume hologram photographic material 1, and 4, respectively.

Figure 3:
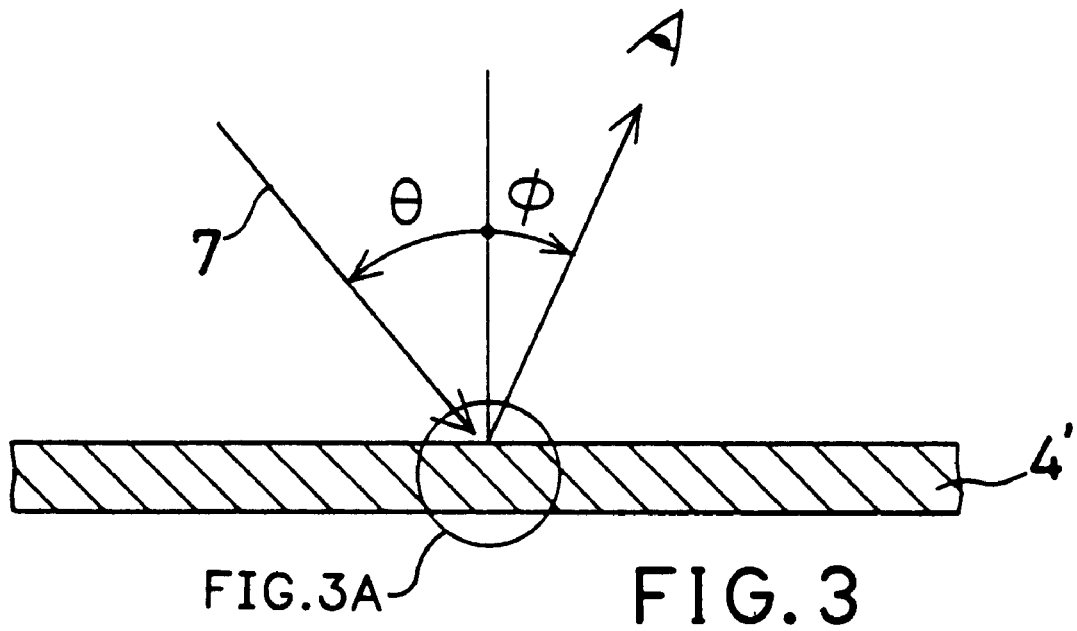
FIGS. 3 and 3A are schematics illustrative of an illumination angle and a central viewing angle assumed for a replicated volume hologram.
Figure 3A:
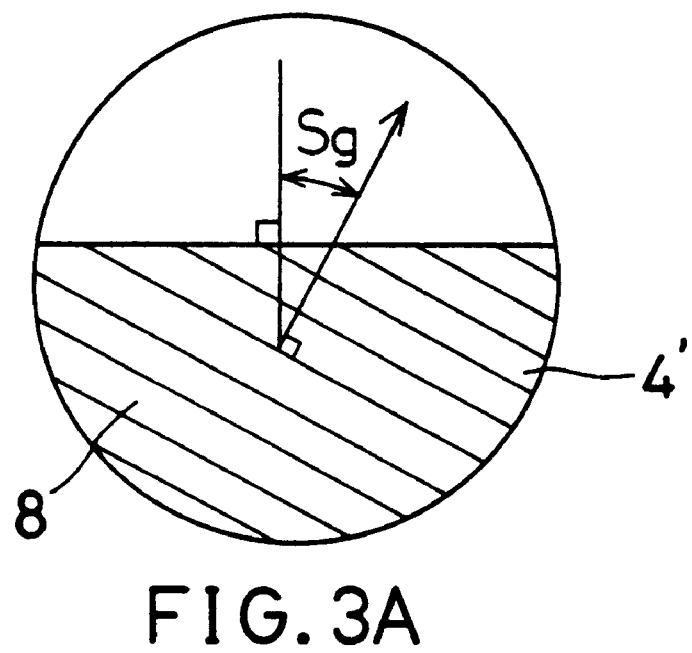

Now suppose that the thus replicated volume hologram 4' is viewed from a direction lying within an angle range around an angle $\phi$ with illumination light 7 incident thereon at an angle of incidence $\theta$, as depicted in FIGS. 3 and 3A. Hereinafter, that angle of incidence $\theta$ will be called the supposed illumination angle and that viewing angle $\phi$ will be called the supposed viewing center angle. To enable such viewing, it is required that a group of fringes 8 be replicated in the volume hologram 4', said group of fringes 8 being at least such that, in the vicinity of an apex defined by the slant angle $S_g$, the degree of recording is weaker farther away from the slant angle $S_g$.

Before determining the condition for the angle of incidence $I_1$ of the replicating illumination light 5 for the replication of such a group of fringes 8, symbols used hereinafter are defined together.

$i_0$ is the angle of incidence of reference light for the recording of the original plate.

$\lambda_0$ is the wavelength at which the original plate is recorded.

$\nu_0$ is the degree of shrinkage of the photographic material with the original hologram recorded therein.

$\tau_0$ is the change in the slant angle of fringes recorded in the original plate.

$I_1$ is the angle of incidence of the replicating illumination light.

$\lambda_1$ is the wavelength at which replication is made.

$\nu_1$ is the degree of shrinkage of the replicating photographic material $\tau_1$ is the change in the slant angle in the replicated fringes.

$n_0$ is the external refractive index of the photographic material.

$n_1$ is the internal refractive index of the photographic material.

$\theta$ is the supposed illumination angle.

$\phi$ is the supposed center viewing angle.

$S_g$ is the supposed slant angle.

The slant angle mentioned above should satisfy $$S_g = (\theta' + \phi')/2 = \{\sin^{-1}(n_0/n_1 \times \sin\theta) + \sin^{-1}(n_0/n_1 \times \sin\phi)\} \quad (1)$$

wherein, for simplicity, the angles in the photographic materials 1 and 4 are marked with '.

When fringes having a slant angle $S_g$, which are recorded in the original plate 1' but not post-treated, are replicated in the replicated and post-treated hologram 4' in the form of fringes having the same slant angle $S_g$, the pitch (inter-fringe distance) $P_{r0}$, upon replicated (FIG. 2), of the fringes recorded in the original plate 1' is given by $$P_{r0} = \nu_0 n_0 \lambda_0 / \{2n_1 \cos(I_0' - S_g - \tau_0)\} \quad (2)$$

The pitch $P_{r1}$ (slant angle $S_g - \tau_1$), upon replicated (FIG. 2), of the fringes recorded at the slant angle $S_g$ in the replicated and post-treated hologram 4' is given by $$P_{r1} = n_0 \lambda_1 / \{2n_1 \cos(I_1' - S_g + \tau_1)\} \quad (3)$$

Suppose here that the refractive indices $n_1$ of both photographic materials 1 and 4 are equal, and both the fringes of the original plate 1' to be replicated and the fringes to be replicated and recorded in the photographic material 4 conform to the Bragg condition. Then, $$P_{r0} = P_{r1} \quad (4)$$

From equations (1) to (4), we can find the angle of incidence $I_1$ of the illumination light 5 for replication as follows.

$$v_0 n_0 \lambda_0 / \{2n_1 \cos(I_0' - S_g - \tau_0)\} = n_0 \lambda_1 / \{2n_1 \cos(I_1' - S_g + \tau_1)\} \quad (5)$$

$$v_0 \lambda_0 / \cos(I_0' - S_g - \tau_0)\} = \lambda_1 / \cos(I_1' + S_g - \tau_1) \quad (6)$$

$$\cos(I_1' - S_g + \tau_0) = \lambda_1 / (v_0 \lambda_0) \times \cos(I_0' - S_g - \tau_0)$$

$$I_1' = \pm \cos^{-1}\{\lambda_1 / (v_0 \lambda_0) \times \cos(I_0' - S_g - \tau_0)\} + S_g - \tau_1$$

$$\sin^{-1}(n_0 / n_1 \times \sin I_1) = S_g - \tau_1 \pm \cos^{-1}[\lambda_1 / (v_0 \lambda_0) \times$$

$$\cos\{\sin^{-1}(n_0 / n_1 \times \sin I_0) - S_g - \tau_0\}]$$

$$I_1 = \sin^{-1}\ll n_1 / n_0 \times \sin(\pm \cos^{-1}[\lambda_1 (v_0 \lambda_0) \times$$

$$\cos\{\sin^{-1}(n_0/n_1 \times \sin I_0) - \{\sin^{-1}(n_0/n_1 \times \sin \theta) +$$

$$\sin^{-1}(n_0/n_1 \times \sin \phi)\}/2 - \tau_0\}] +$$

$$\{\sin^{-1}(n_0/n_1 \times \sin \phi) + \sin^{-1}(n_0/n_1 \times \sin \theta)\}/2 - \tau_1)\gg$$

$$f = (I_0, \theta, \phi, v_0, \lambda_1 / \lambda_0, n_1 / n_0, \tau_0, \tau_1)$$

Thus, when the original plate is replicated with the illumination light 5 at the angle of incidence $I_1$ conforming to equation (6), a fringe having at least a specific slant angle $S_g$ is selected from a multiplicity of fringes which are formed by light 3 scattered by the object O in multiple directions upon recording (FIG. 1) and have a variety of slant angles, so that said fringe can finally be replicated in the form of a fringe having the same slant angle $S_g$. While care has been taken of the slant angle changes $\tau_0$ and $\tau_1$ in the foregoing, it is understood that they are negligible in actual volume holograms.

As can be seen from the above calculations, there are two angles of incidence $I_1$ that satisfy $P_{r0} = P_{r1}$. Variables for cosine on both sides of equation (5), i.e., $\{\sin^{-1}(n_0/n_1 \times \sin I_0) - S_g - \tau_0\}$ and $\{\sin^{-1}(n_0/n_1 \cdot \sin I_1) - S_g + \tau_1\}$ are discriminated depending on whether their signs are different or identical. When they have the same sign, $I_1$ is described as $I_1^A$, and when they have opposite signs, $I_1$ is described as $I_1^B$. Consider now a pitch change at the supposed slant angle $S_g + \Delta S$.

Figure 4A:
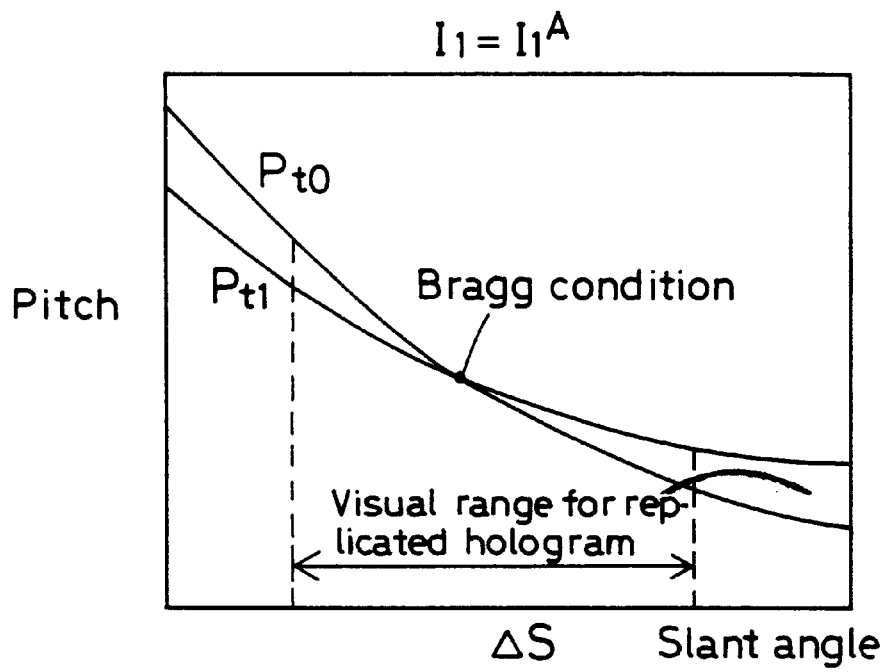
FIGS. 4(a) and 4(b) are comparative graphs showing the fringe slant angle vs. fringe pitch relation concerning two specific angles of incidence of replicating illumination light.
Figure 4B:
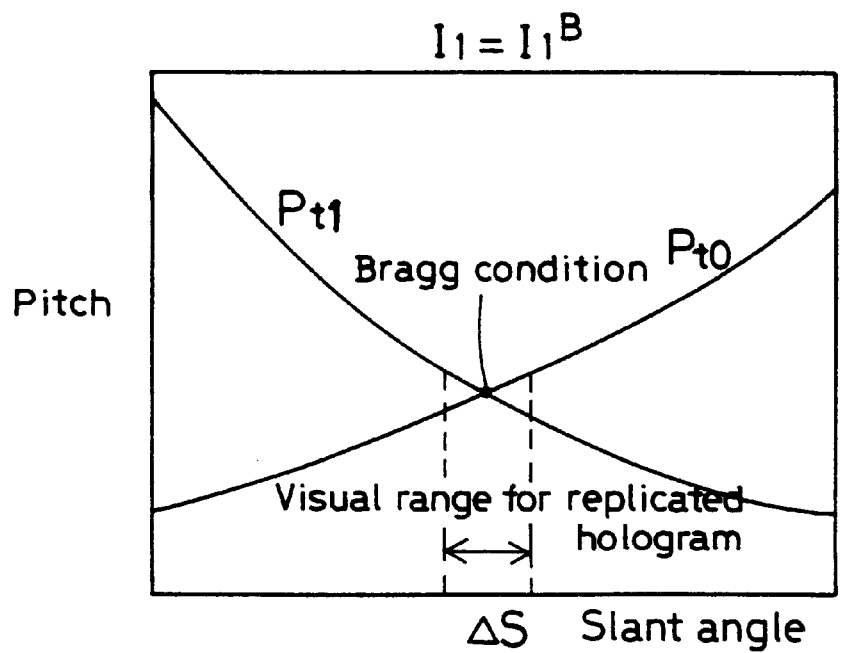

In the case of $I_1^A$, the directions of $P_{r0}$ and $P_{r1}$ changes with an increase or decrease in $\Delta S$ coincide as schematically depicted in FIG. 4(a). In the case of $I_1^B$, in contrast, the directions of $P_{r0}$ and $P_{r1}$ changes with an increase or decrease in $\Delta S$ do not coincide as schematically depicted in FIG. 4(b). This means that the slant angle change $\Delta S$ of a fringe with respect to a fringe meeting the Bragg condition, by which fringe incident light diffracted at the slant angle $S_g$ while satisfying the Bragg condition is diffracted at half the diffraction efficiency of the first-mentioned fringe, is larger when replication is made at $I_1^A$ than when replication is made at $I_1^B$. At both $I_1^A$ and $I_1^B$, the diffraction efficiency of the fringe is increased at the slant angle $S_g$ equivalent to the Bragg condition. As a certain fringe is farther away from that fringe, its diffraction efficiency becomes lower because the amount of departure from the Bragg condition becomes larger. It is thus possible to preferentially record the hologram of a fringe satisfying the Bragg condition and so obtain a hologram with the brightness fading out around that fringe.

The degree of this fading-out is sharper at $I_1^B$ than at $I_1^A$. In other words, a fringe having a wider slant angle $S_g$ can be replicated at the angle of incidence $I_1^A$ than at $I_1^B$. This means that it is at the angle of incidence $I_1^A$ that a hologram copy having a wider visual range (viewing angle range), around the supposed slant angle $S_g$ can be obtained while it is at the angle of incidence $I_1^B$ that a hologram copy having a narrower visual range (viewing angle range) around the supposed slant angle $S_g$ can be obtained.

Figure 5:
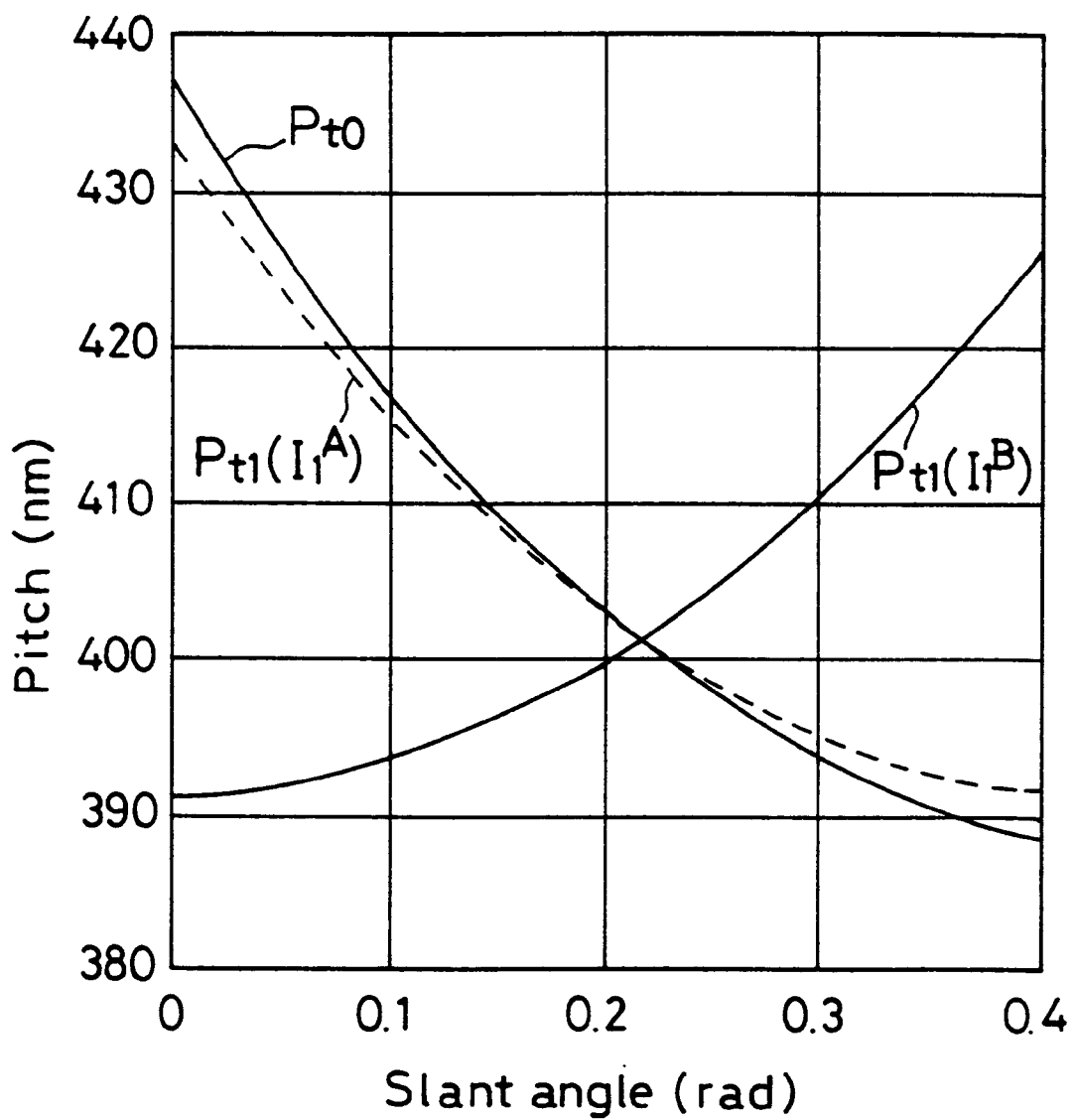
FIG. 5 is a graph with the fringe slant angle vs. fringe pitch relation expressed by exemplary numerical values.

In one specific embodiment, if $I_0 = 45°$, $\lambda_0 = 514.5$ nm, $v_0 = 0.99$, $\lambda_1 = 514.5$ nm, $n_0 = 1$, $n_1 = 1.52$, $\theta = 40°$, $\phi = 0°$, and $\tau_0 = \tau_1 = 0$, then $S_g = 12.51°$ (0.218 rad), $I_1^A = 40.74°$ (0.71 rad), and $I_1^B = -0.62°$ (−0.01 rad). Shown in FIG. 5 are the relations between the pitch and slant angle of a fringe recorded in the original plate and the pitch and slant angle of the same fringe in the replicated and post-treated hologram.

Thus, the present invention provides a method for replicating or copying a volume hologram having an image of a scattering object recorded therein by the hologram replicating technique, wherein the angle of incidence $I_1$ of illumination light used for the replication of a hologram from the original hologram plate is determined from equation (6) so that a replicated hologram can be viewed at a supposed viewing center angle $\phi$ upon illuminated at a supposed illumination angle $\theta$. Alternatively, the present invention provides a method for replicating a volume hologram having an image of a scattering object recorded therein by the hologram replicating technique, wherein replicating illumination light is incident on the original hologram plate at an angle of incidence $I_1$ that enables a fringe having a supposed slant angle $S_g$ to be replicated and recorded therein so that a replicated hologram can be viewed at a supposed viewing center angle $\phi$ upon illuminated at a supposed illumination angle $\theta$. By use of such a hologram replicating method it is possible to limit the diffraction of unnecessary light due to zero-order light, etc. arising from regular reflection and limit a visual range capable of viewing the recorded image to a desired range, thereby replicating a hologram that can display an image more brightly than would be possible with the original plate.

Figure 6:
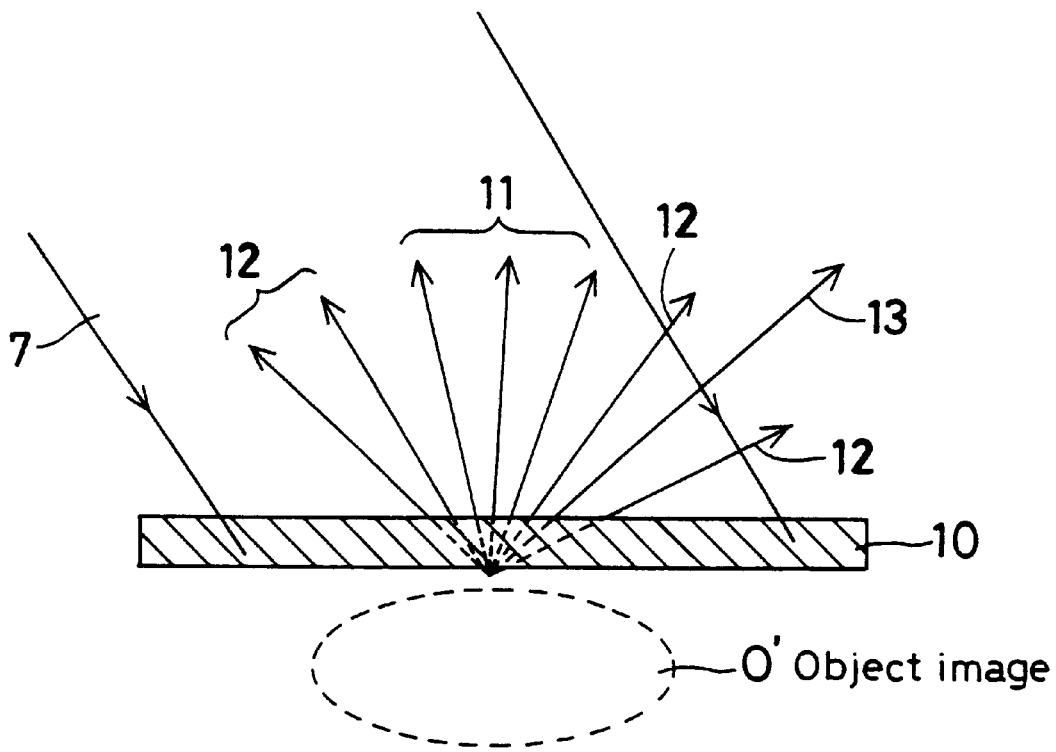
FIGS. 6(a) and 6(b) are schematics illustrative of the qualitative comparison between a conventional volume hologram and a volume hologram obtained by the hologram replicating method of the present invention.
Figure 6:
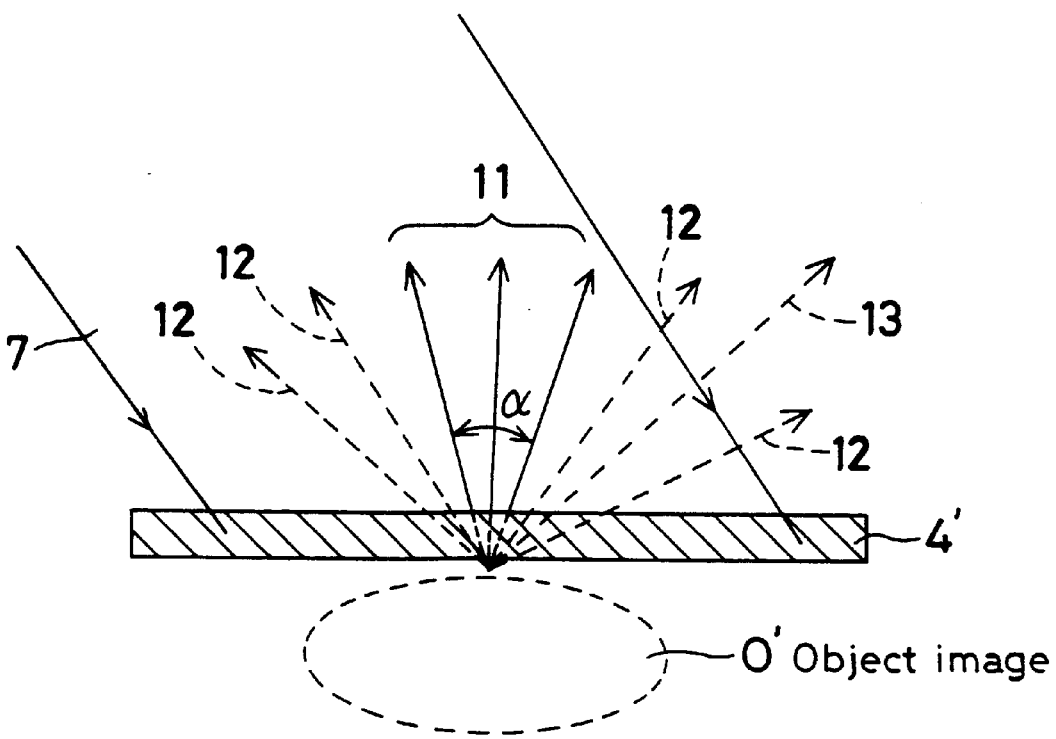

In FIG. 6, a conventional volume hologram having an image of a scattering object recorded therein or a volume hologram copied therefrom by a conventional hologram replicating method (FIG. 6(a)) is qualitatively compared with a volume hologram replicated from a volume hologram having an image of a scattering object recorded therein by the hologram replicating method according to the present invention (FIG. 6(b)). Both holograms are assumed to be reflection type volume holograms. An image O' of a scattering object O is recorded in a conventional volume hologram or a hologram 10 copied therefrom. Therefore, when illumination light 7 strikes the volume hologram 10, the object image O' gives out not only diffracted light 11 in a given viewing direction but also diffracted light 12 in other scattering directions. In addition, diffracted light 13 corresponding to light regularly reflected from the scattering object O upon recording is gave out in directions other than the viewing direction. Since fringes giving out such diffracted light 12 and 13 are multi-recorded in the volume hologram 10, the index modulation of a portion of fringes giving out the diffracted light 11 contributing to real viewing is reduced and, with this, the intensity of the diffracted light 11 becomes weak. Recorded in a volume hologram 4' replicated from a volume hologram having an image O' of a scattering object O recorded therein according to the hologram replicating method of the present invention, on the other hand, are only fringes that direct diffracted light 11 within a limited visual range α. In other words, fringes that give out diffracted light 12 in other directions and diffracted light 13 corresponding to light regularly reflected from the scattering object O upon recording are removed and so not recorded upon replication. Accordingly, the index modulation of the fringes giving out the diffracted light 11 contributing to real viewing is increased and, with this, the intensity of the diffracted light 11 becomes so strong that the object image O' can be more brightly viewed than would be possible with the original plate. Thus, the angle of incidence $I_1$ of the replicating illumination light is so selected in the present invention that the visual range is limited upon replication. Such a limited visual range α makes it possible to increase the intensity of the diffracted light 11 therein and, hence, to view the object image O' more brightly.

When, for instance, the hologram replicating method of the present invention is applied to the fabrication of a hologram diffuse plate by recording a light diffusing plate in the form of a hologram of the scattering object O, fringes that correspond to light regularly reflected from the light diffusing plate upon recording are removed and so not recorded upon replication. Therefore, when such a hologram diffuse plate is built in a liquid crystal display device, etc., the display device is unlikely to give out diffracted light corresponding to a regular reflection component of illumination light. It is thus possible to obtain a hologram diffuse plate that can create bright displays by assigning light diffracted in a regular reflection direction to light in the direction taking part in viewing, for instance, diffracted light directing from an illumination angle of 30° toward a viewing direction of 0° (from the normal).

The aforesaid argument is applied to the case where the angle of incidence of replicating illumination light is selected such that the visual region upon replication is limited to one-dimensional direction, for instance, an x-direction. In other words, the visual region is not limited to a y-direction perpendicular to the x-direction (on condition that the surface of the hologram is parallel with an x-y plane); not only the diffracted light leaving in a given viewing direction but also the diffracted light leaving in other scattering directions is diffracted in the y-direction. In addition, the diffracted light which corresponds to the diffracted light specularly reflected from the scattering body upon recording, too, is diffracted in a direction other than the viewing direction. Correspondingly, the diffracted light contributing to actual observation in the y-direction becomes weak.

Figure 7A:
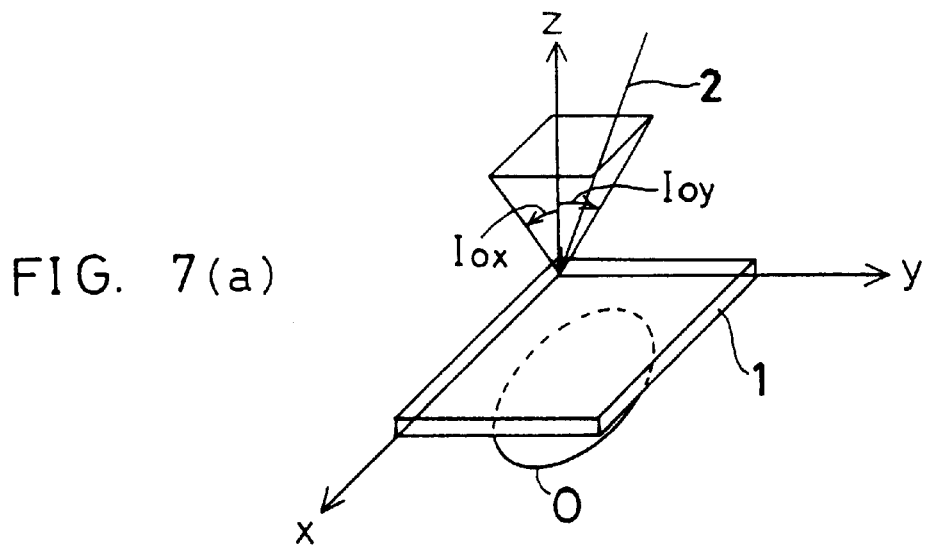
FIGS. 7(a)–7(c) are schematics illustrative of a hologram replicating method wherein the hologram replicating method of the invention is two-dimensionally extended.

In the invention, the same replicating method as mentioned above may be applied to the y-direction to select the angle of incidence of replicating illumination light in such a manner as to limit the visual range in either one of the two directions perpendicular to the surface of the hologram. This method is explained with reference to a reflection hologram. As shown in FIG. 7(a), a volume hologram photosensitive material 1 located in front of an object O is first irradiated with illumination light 2, so that the incident light 2 interferes with light scattered from the object O in the volume hologram photosensitive material 1 to record a first original hologram plate 1' therein. Here assume that the volume hologram photosensitive material 1 is parallel with an x-y plane, and that $I_{Ox}$ represents a component of the angle of incidence of the illumination light 2 projected on an x-z plane (an x-direction component) and $I_{Oy}$ represents a component projected on a y-z plane (a y-direction component).

Figure 7B:
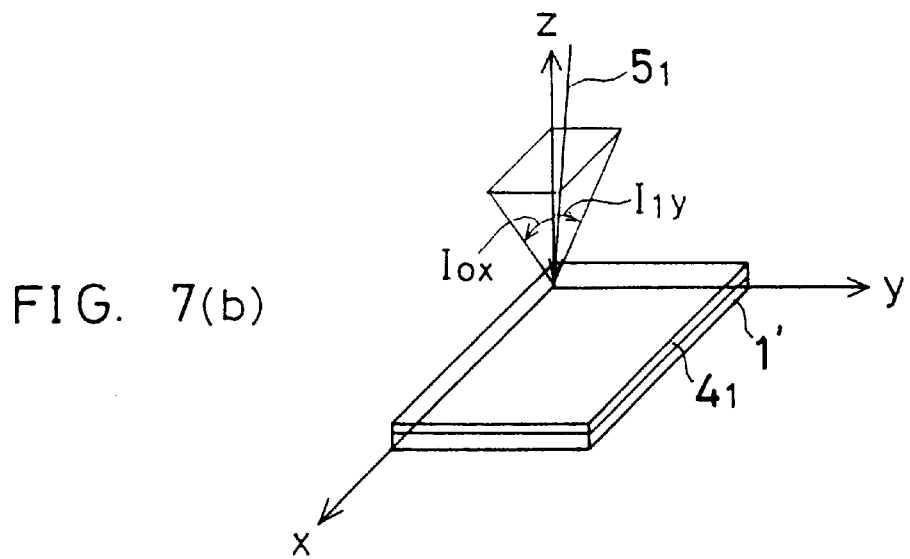

Next, as shown in FIG. 7(b), another volume hologram photosensitive material $4_1$ is superposed on the first original hologram plate 1' recorded as in FIG. 7(a) and post-treated in close contact therewith or in slightly spaced relation thereto. Illumination light $5_1$ of wavelength $\lambda_1$ is then incident on the volume hologram photosensitive material $4_1$ at an angle of incidence $I_{Ox}$ of the x-direction component and an angle of incidence $I_{Oy}$ of the y-direction component, so that the incident light interferes with light diffracted from the first original hologram plate 1' in the volume hologram photosensitive material $4_1$ for the formation of a second hologram by replication. Here let $\theta_y$ represent a supposed illumination angle component in the y-direction and $\phi_y$ stand for a supposed viewing center angle component in the y-direction. The angle of incidence $I_{1y}$ of the y-direction component in this case is an angle of incidence which enables a fringe to be recorded by replication at a supposed slant angle $S_{gy}$ at which the volume hologram photosensitive material $4_1$ is illuminated at the supposed illumination angle component $\theta_y$ in the y-direction and the hologram is observed at the supposed viewing center angle component ($\phi_y$ in the y-direction, and which satisfies the aforesaid equation (6).

Figure 7C:
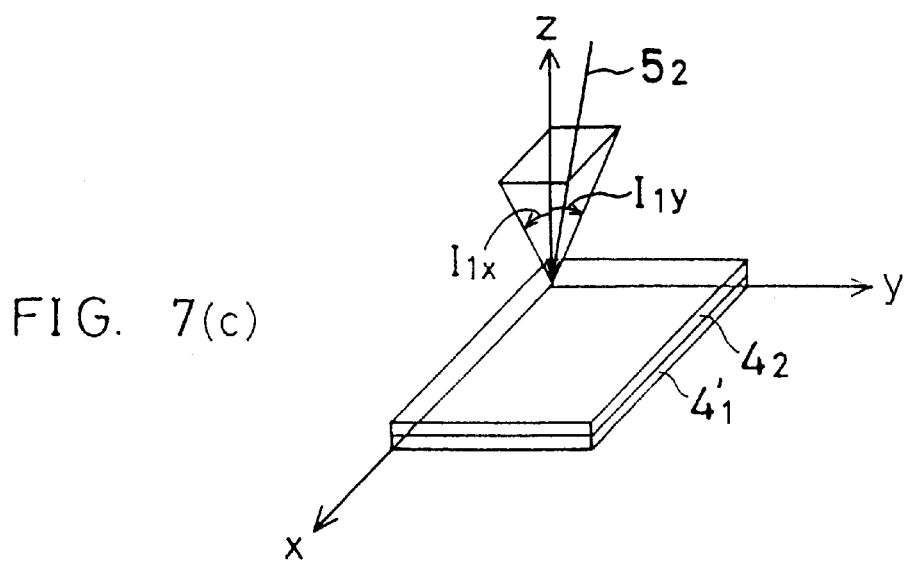

Finally, as shown in FIG. 7(c), yet another volume hologram photosensitive material $4_2$ is superposed on the second original hologram plate $4_1'$ recorded as in FIG. 7(b) and post-treated in close contact therewith or in spaced relation thereto. Illumination light $5_2$ of wavelength $\lambda_1$ is then incident on the volume hologram photosensitive material $4_2$ at an angle of incidence $I_{1x}$ of the x-direction component and an angle of incidence $I_{1y}$ of the y-direction component, so that the incident light interferes with light diffracted from the first original hologram plate $4_1'$ in the volume hologram photosensitive material $4_2$ for the formation of a second hologram by replication. Here let $\theta_x$ represent a assumed illumination angle component in the x-direction and $\phi_x$ stand for a supposed viewing center angle component in the x-direction. The angle of incidence $I_1$ x of the x-direction component in this case is an angle of incidence which enables a fringe to be recorded by replication at a supposed slant angle $S_{gx}$ at which the volume hologram photosensitive material $4_2$ is illuminated at the supposed illumination angle component $\theta_x$ in the x-direction and the hologram is observed at the supposed viewing center angle component $\phi_x$ in the x-direction, and which satisfies the aforesaid equation (6).

Thus, at the first replication stage, the angle of incidence of the x-direction component of the illumination light $5_1$ is kept identical with the angle of incidence $I_{Ox}$ of the x-direction component of the illumination light 2 for recording the first original hologram plate 1' to hold the angle of incidence of the y-direction component at the angle $I_{1y}$ satisfying equation (6), and at the second replication stage, the angle of incidence of the x-direction component of the illumination light $5_2$ is kept identical with the angle of incidence $I_{1y}$ of the y-direction component of the illumination light $5_1$ for the formation of the second hologram original plate $4_1'$ to hold the angle of incidence of the x-direction component at the angle $I_{1x}$ satisfying equation (6). In this way, only a fringe that diffracts the diffracted light in the visual range limited in both the two-dimensional directions with respect to the x- and y-directions is recorded; fringes that diffract the diffracted light leaving in either directions and diffracted light corresponding to specularly reflected light from the scattering body 0 upon recording are removed at both the replicating stages and so are not recorded. Consequently, the modulation of the refractive index of the fringe that diffracts the diffracted light contributing to actual observation increases, and so the intensity of the diffracted light increases. When the hologram is illuminated from the illumination angle $\theta_x$ of the x-direction component and the illumination angle $\theta_y$ of the y-direction component, it is thus possible to observe an object image brighter, as compared with the original plate, in the visual range limited in both the two-dimensional directions with respect to the x- and y-directions at the viewing center angle $\phi_x$ of the x-direction and the viewing center angle $\theta_y$ of the y-direction component.

It is here to be noted that the step of FIG. 7(c) may be carried out prior to the step of FIG. 7(b).

The volume hologram replicated by the hologram replicating method of the present invention is a volume hologram in which the image of the scattering object is recorded. Also recorded in this volume hologram are only fringes that are positioned around a fringe having a slant angle $S_g$ at which the volume hologram can be viewed at a given viewing center angle $\phi$ upon illuminated at a given illumination angle $\theta$, and that have a slant angle $S_g$ lying within a given width $\Delta S$ with respect to the first-mentioned slant angle $S_g$. Such a volume hologram can be viewed only in a direction lying within a given visual range a around the viewing center angle $\phi$; in other words, it is transparent when viewed in other directions. According to the present invention the visual range can be freely controlled, and so it is possible to crate a variety of images, as typically illustrated in FIG. 8. As shown, a volume hologram 20 in which, according to the present invention, the visual range is preset in a narrow direction 23 using the aforesaid angle of incidence $I_1^B$ of replicating illumination light as an example, is underlaid with a pattern 21 formed by an ordinary printed pattern, etc., and the visual range 23 for the volume hologram 20 is determined in such a direction that the underlaid pattern 21 cannot be viewed at all. When such a superposed arrangement is illuminated by illumination light 22, only the underlaid pattern 21 can be viewed in a front direction 24 while the object recorded in the volume hologram 20 can be viewed in the direction 23. Thus, the printed or otherwise underlaid pattern 21 and the object image recorded in the volume hologram 20 can be separately recognized.

Figure 9:
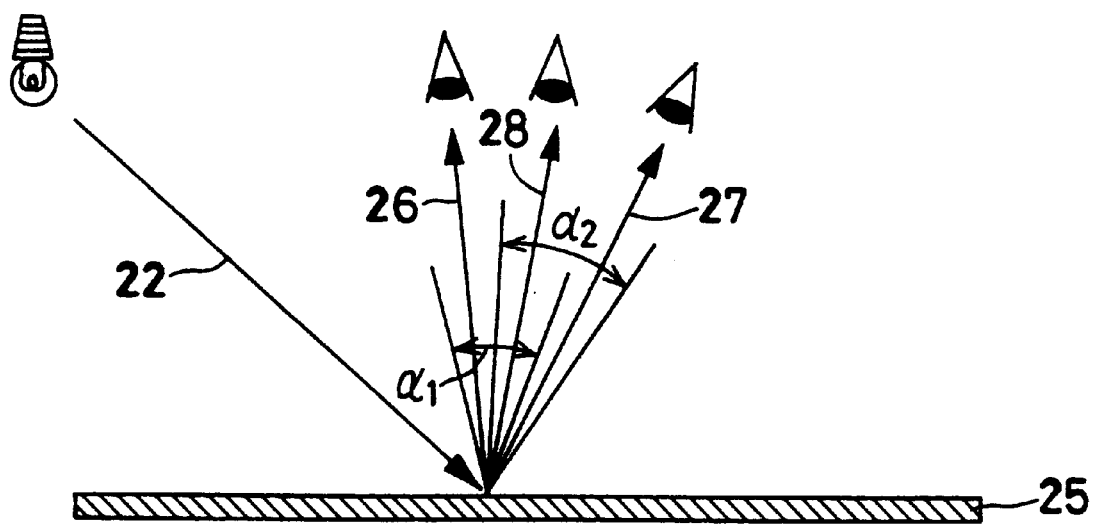
FIG. 9 is a schematic illustrative of another exemplary application of the hologram.

Referring here to FIG. 9, a first fringe having a first image recorded therein and a specific visual range $\alpha_1$ and a second fringe having a second image recorded therein and another specific visual range $\alpha_2$ overlapping partially with the visual range $\alpha_1$ are replicated and recorded in one single volume hologram 25 by the method of the present invention as will be described later. With this volume hologram 25 illuminated by illumination light 22, the first hologram image can be viewed in a direction 26 within the visual region $\alpha_1$, the second hologram image can be viewed in a direction 27 within the visual region $\alpha_2$, and the first and second hologram images can be simultaneously viewed in a direction 28 within a region where the visual ranges $\alpha_1$ and $\alpha_2$ overlap. In other words, the hologram images change from one to another by changing the viewing direction. In the practice of the present invention, it is understood that three or more hologram images may be recorded in the volume hologram with varying visual ranges.

In order to use the method of the present invention to fabricate a hologram 25 that enables different images to be viewed for each viewing direction, a first object image is recorded in a first volume hologram at a wavelength $\lambda_0$ and an angle of incidence $I_{01}$ of reference light used for making the original plate. In this case, the angle of incidence $I_{01}$ of the reference light is determined from equation (6) in such a manner that the angle of incidence of replicating illumination light is $I_1$, the supposed illumination angle is $\theta$, and the supposed viewing center angle is $\phi_1$ (the center angle of the visual range $\alpha_1$). Then, a second object image is recorded in a second volume hologram at the same wavelength $\lambda_0$ and an angle of incidence $I_{02}$ of reference light. In this case, the angle of incidence $I_{02}$ of the reference light is determined from equation (6) in such a manner that the angle of incident of replicating illumination light is $I_1$ as in the case of the first volume hologram, the supposed illumination angle is $\theta$ as in the case of the first volume hologram, and the supposed viewing center angle is $\phi_2$ (the center angle of the visual region $\alpha_2$). Thereafter, the first volume hologram is superposed on the second volume hologram to form the original plate. By replicating that original plate using illumination light at the angle of incidence $I_1$, the first and second fringes whose supposed viewing center angles are $\phi_1$ and $\phi_2$ are multi-recorded in the single volume hologram 25.

Figure 8:
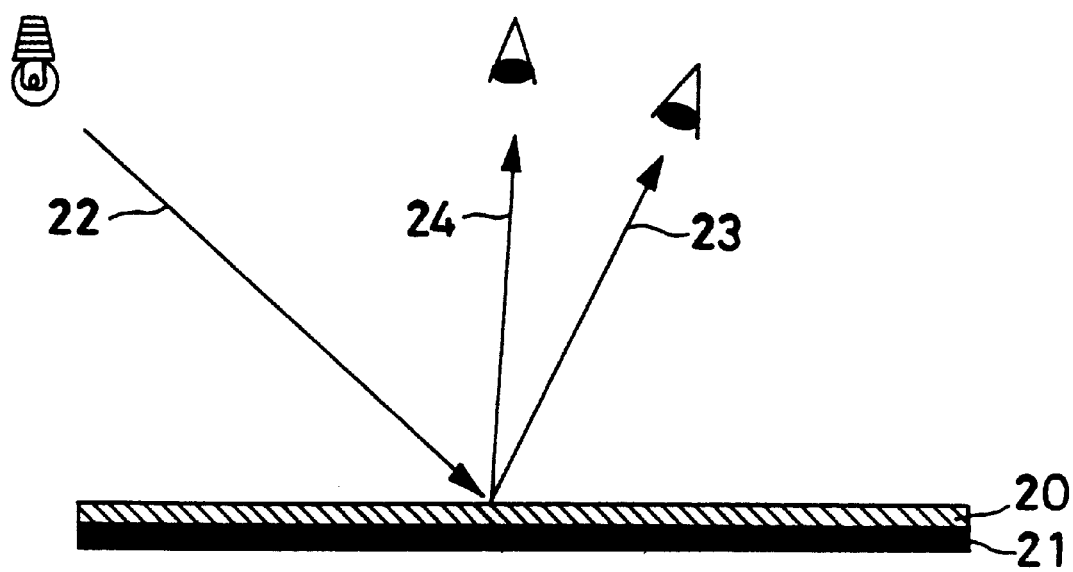
FIG. 8 is a schematic illustrative of one exemplary application of the volume hologram copied by the hologram replicating method of the present invention.

It is noted that the hologram 25 shown in FIG. 9 may be used as the volume hologram 20 shown in FIG. 8. It is also noted that logotypes such as letters, and marks may be used for one of the first and second images recorded in the hologram 25 and subjects such as objects may be used for the other.

Figure 10A:
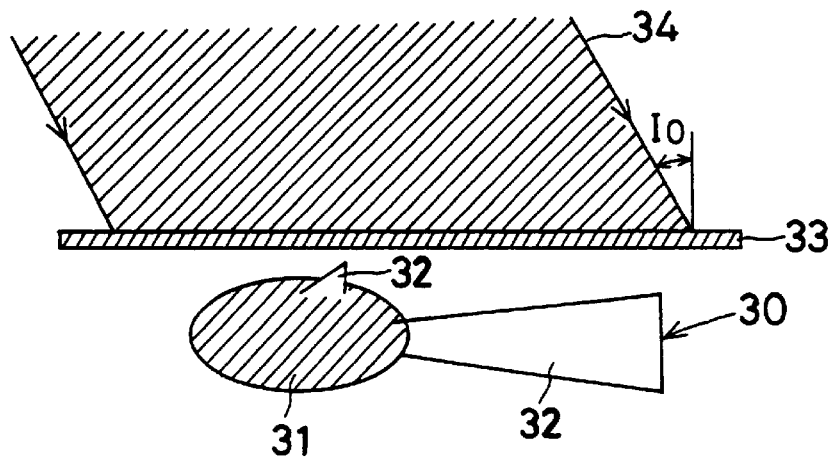
FIGS. 10(a) to 10(c) are schematics illustrative of yet another exemplary application of the hologram.
Figure 10B:
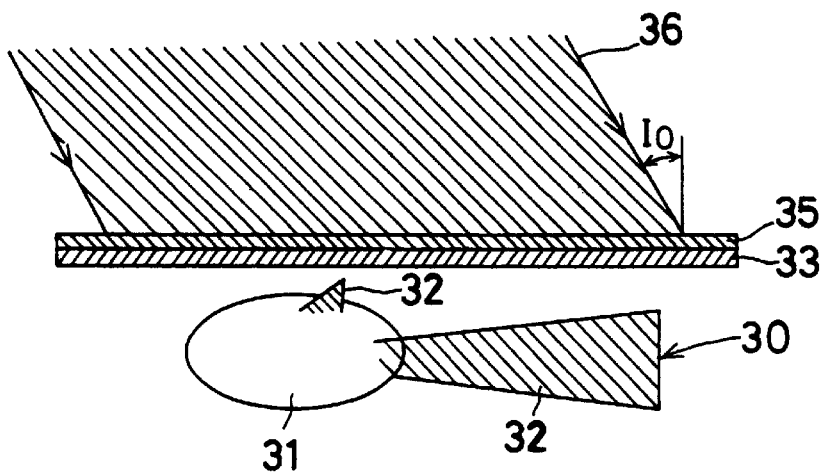

How to fabricate a multicolor Lippmann type hologram according to the method of the present invention will now be explained. Consider here the fabrication of a multicolor Lippmann type hologram of an object comprising a blue light scattering portion 31 and a red light scattering portion 32, as shown in FIG. 10. In the first place, a blue volume hologram photographic material 33 is located over the object 30, as shown in FIG. 10(a). Then, illumination light 34 of wavelength $\lambda_{OB}$ in a blue wavelength region is incident at an angle of incidence $I_0$ on the blue volume hologram photographic material 33 so that light produced by the scattering of the transmitted light at the blue light scattering portion 31 of the object 30 and the incident light 34 interfere in the blue volume hologram photographic material 33, thereby recording a blue volume hologram. Then, a red volume hologram photographic material 35 is superposed on the blue volume hologram, as shown in FIG. 10(b). Then, illumination light 36 of wavelength $\lambda_{OR}$ in a red wavelength region is incident at the same angle of incidence $I_0$ as mentioned above on the red volume hologram photographic material 35 so that light produced by the scattering of the transmitted light at the red light scattering portion 32 of the object 30 and the incident light 36 interfere in the red volume hologram photographic material 35, thereby recording an red volume hologram. Both materials 35 and 36, as superposed on each other, are post-treated to obtain the original plate 37.

Figure 10C:
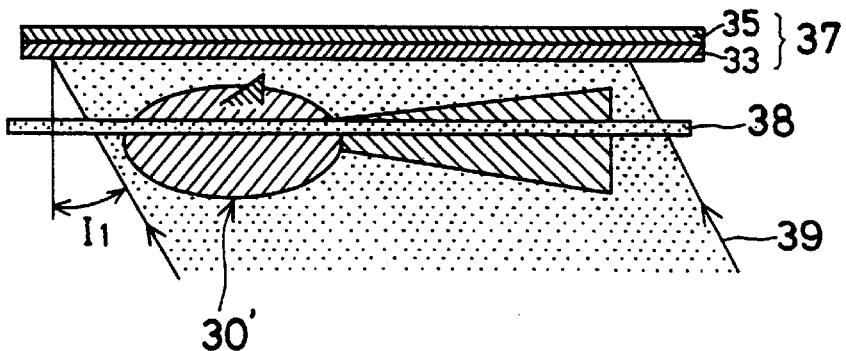

Then, as shown in FIG. 10(c), another volume hologram photographic material 38 photosensitive to both blue and red wavelength regions is located at a position under the original plate 37, where the object 30 was located for hologram recording, in such a manner that it is parallel with the original plate 37. Whereupon, replicating illumination light 39, which is composed of light of wavelength $\lambda_{1B}$ in the blue wavelength region and light of wavelength $\lambda_{1R}$ in the red wavelength region in overlapping or separate relation to each other, is incident at the angle of incidence $I_1$ on the lower side of the original plate 37. Consequently, an image 30' of the object 30 is reconstructed in the vicinity of the surface of the volume hologram photographic material 38, so that the original plate 37 is replicated in the volume hologram photographic material 38. The hologram replicated and recorded in the volume hologram photographic material 38 in this way is a Lippmann type multicolor image hologram (image plane hologram). Here suppose the wavelengths $\lambda_{1B}$ and $\lambda_{1R}$ used for replication to satisfy $\lambda_{1B}/\lambda_{OB}=$ $\lambda_{1R}/\lambda_{0R}=C$ (e.g., 1 if they are all the same) with respect to the wavelengths $\lambda_{0B}$ and $\lambda_{0R}$ used for the recording of the original plate 37. It is then found from the shape of equation (6) that the same $\lambda_1/\lambda_0=C$ holds whether the light is blue or red; that is, $I_1$ is not dependent on wavelength. Accordingly, when the same $\theta$ and $\phi$ are used for both blue light and red light, holograms are recorded at the same $I_0$, and replicated at the same angle of incidence $I_1$ of the replicating illumination light whether the light is blue or red. In the practice of the present invention, it is understood that it is possible to fabricate a multicolor Lippmann type hologram in three or more colors.

The thus fabricated multicolor Lippmann type hologram can create bright multicolor hologram images because only fringes having the necessary slant angle component are preferentially recorded for each color. In addition, the embodiment shown in FIG. 10, wherein the volume hologram photographic material 38 is spaced away from the original plate 37 during replication, enables the multicolor Lippmann type hologram to be fabricated in the form of an image hologram which, even upon reconstruction in nonparallel white light, can create a clear, bright hologram image.

While the hologram replicating method, and hologram according to the present invention has been described with reference to the principles and embodiments thereof, it is understood that the present invention is not limited thereto, and so many modifications may be possible.

As can be appreciated from the foregoing explanation, the hologram replicating method of the present invention provides a replicated hologram which can display a hologram image more brighter than would be possible with the original hologram plate because the diffraction of unnecessary light due to zero-order light, etc., arising from regular reflection is limited and the visual range capable of viewing a recorded image is limited to a desired range. This feature of the present invention is due to the fact that replicating illumination light is incident on the original hologram plate at an angle of incidence $I_1$ at which a group of fringes can be replicated and recorded, said group of fringes being such that, in the vicinity of an apex defined by a supposed slant angle $S_g$ at which the replicated hologram can be viewed at a supposed viewing center angle $\phi$ upon being illuminated at a supposed illumination angle $\theta$, the recording degree of said group of fringes becomes weaker at a position farther away from said slant angle $S_g$.

An account will now be given of the hologram display piece according to the present invention that is one volume hologram having an image of a scattering object recorded therein, to which the aforesaid hologram replicating method is applied, and how to fabricate the same. This hologram display piece is particularly suitable for cards such as identification cards and bank cards, passbooks such as bankbooks, and forgery preventing means which verify that articles with such means attached to them are true.

The hologram display piece of the present invention, and how to fabricate the same will now be explained with reference to some preferred embodiments.

The hologram display piece of the present invention is basically a display piece that enables a specific fine pattern located behind a small virtual opening like a keyhole to be seen through the virtual opening. Between the virtual opening and the fine pattern there is a given distance so that the fine pattern seen through the opening can move and change by the relative movement of the observer's visual point. Because of this action, the display piece is difficult to forge, and can be attached to an article to pass judgment of whether it is true or not.

Figure 11:
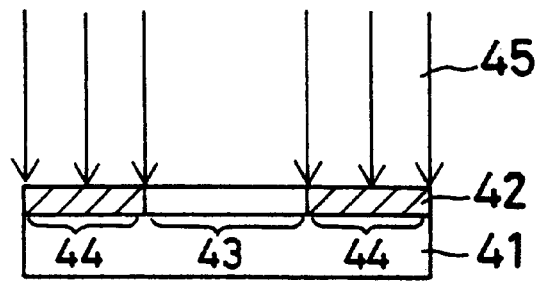
FIGS. 11(a)–11(c) are schematics illustrative of a part of the hologram display fabricating method according to one embodiment of the present invention.
Figure 11:
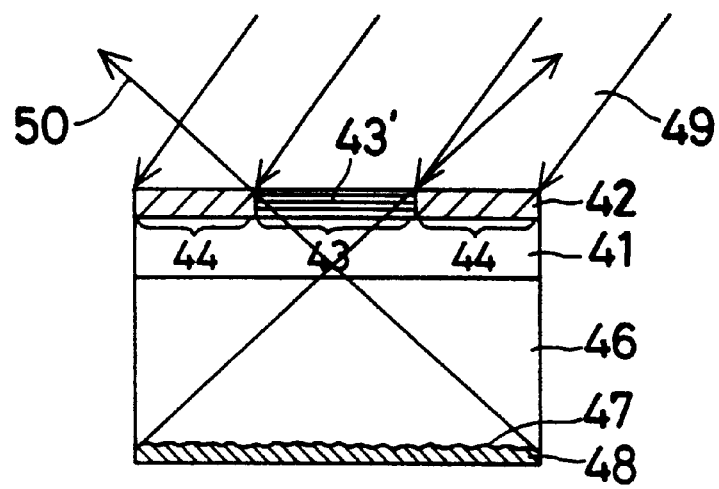
Figure 11:
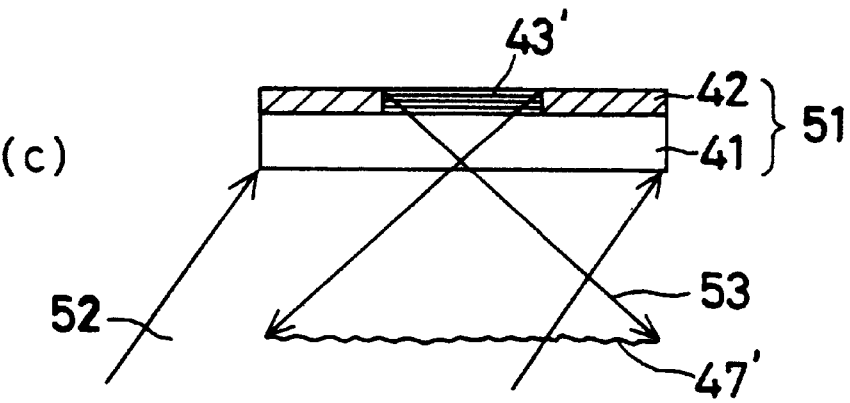

How to fabricate the hologram display piece of the present invention will now be explained with reference to one specific embodiment shown in FIGS. 11 and 12. As shown in FIG. 11(a), a volume phase type hologram photographic material layer 42 such as a photopolymer is first coated on the surface of a glass substrate 41. While an opening pattern portion 43 of the hologram photographic material layer 42 corresponding to a virtual opening pattern is left intact, an area 44 of the layer 42 except the opening pattern portion 43 is irradiated and deactivated with a light beam 45 such as an ultraviolet beam to which the hologram photographic material layer 42 is so photosensitive that it is deactivated.

Then, as depicted in FIG. 11(b), a reflecting scatter plate is prepared by the vapor evaporation of a reflective metal such as aluminum on one roughened surface 7 of a glass plate 46 to form a reflecting scatter surface 47. Subsequently, the surface of the reflecting scatter plate that is not opposite to the glass plate 46 is brought into close contact with the back surface of the glass substrate 41. In this state, a recording light beam 49 is incident on the hologram photographic material layer 42 at a given angle. The light beam 49 passes through the areas 43 and 44 of the hologram photographic material layer 42, goes straightforward through the glass substrate 41 and glass plate 46, and reaches the reflecting scatter surface 47. Light 50 reflected and scattered at the surface 47 and the light beam 49 interfere in the opening pattern 43 in the hologram photographic material layer 42 to form a reflection hologram 43'.

As shown in FIG. 11(c), light 52 traveling in a direction opposite to the traveling direction of the recording light beam 49 is incident from the opposite (back) side of the thus fabricated original plate 51 (consisting of the glass substrate 41 and the hologram photographic material layer 42 composed of the hologram-recorded area 43 and the deactivated area 44) on the reflection hologram 43' thereof, so that light 53 reflected and diffracted by the reflection hologram 43' can have action on forming an image 47' of the reflecting scatter surface 47 at a position where the reflecting scatter surface 47 was originally located.

Figure 12A:
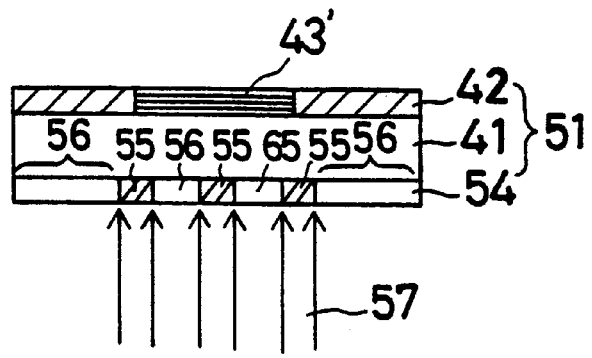
FIGS. 12(a)–12(c) are schematics illustrative of another part of the hologram display fabrication method according to the first embodiment of the present invention.

Then, as depicted in FIG. 12(a), another volume phase type hologram photographic material layer 54 is coated on the back surface of the glass substrate 41 opposite to the hologram photographic material layer 42 of the original plate 51, and a fine pattern portion 55 corresponding to a fine pattern is irradiated and deactivated with a light beam 57 such as an ultraviolet beam to which the hologram photographic material layer 44 is so photosensitive that it is deactivated. At this stage, an area 56 of the hologram photographic material layer 54 except the fine pattern portion 55 is still of photosensitivity.

Figure 12B:
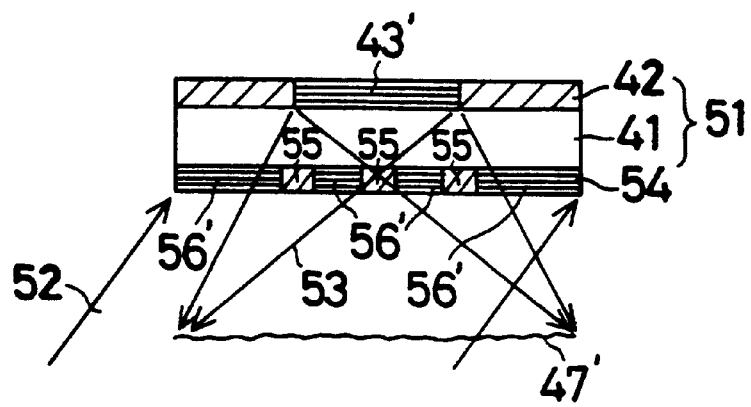
Figure 12C:
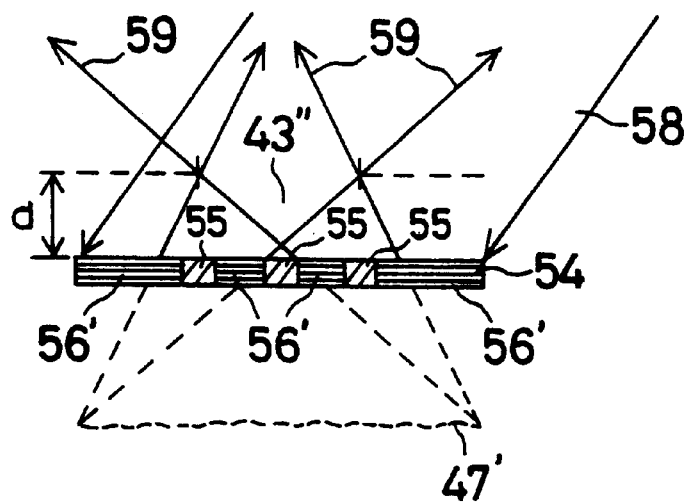

Subsequently, as depicted in FIG. 12(b), light 52 traveling in a direction opposite to the traveling direction of the light beam 49 used for the recording of the reflection hologram 43' is incident on the hologram photographic material layer 54. As explained with reference to FIG. 11(c), light 53 reflected and diffracted by the reflection hologram 43' travels in such a way that an image 47' of the reflecting scatter surface 47 is formed at a position where the reflecting scatter surface 47 was originally located. However, since the hologram photographic material layer 54 is located on the optical axis, the light 53 interferes with the incident light 52 in the photosensitive area 56 except the deactivated fine pattern portion 55 to form a reflection hologram 56'.

The hologram photographic material layer 54 with the hologram 56' recorded therein is then separated from the original plate 51. Upon the incidence on the surface side (where the original hologram photographic material layer 42 was located) of light 58 traveling in a direction opposite to the traveling direction of the recording light 52, as depicted in FIG. 12(*c*), the reflection hologram 56' of the hologram photographic material layer 54 gives out diffracted light 59. This light 59 is diffracted as if it was emitted from the position of the image 47' of the reflecting scatter surface 47. In addition, the diffracted light 59 passes through only an area where the reflection hologram 43' was present at the time of such replication as shown in FIG. 12(*b*), so that it can travel on the same optical path as is the case where an opening 43" is present at a position of the original reflection hologram 43', resulting in the creation of a virtual opening pattern shown again at 43". Any diffracted light is not emitted from the fine pattern portion 55 of the hologram photographic material layer 54. Thus, when the observer sees the hologram photographic material layer 54 in the direction of the diffracted light 59, he can see the fine pattern 55 hidden behind the small virtual opening 43" like a keyhole. Also, since the virtual opening 43" is spaced away from the fine pattern 55 with a certain distance d between them, the fine pattern 55 seen through the opening 43" moves and changes upon the relative movement of the observer's visual point. It is noted that, in some cases, marginal rays other than the reconstructing light 58 are more scattered by the reflection hologram 56' than by the fine pattern portion 55. Thus, if there is a fear that the fine pattern may be seen even a little through portions other than the opening 43", it is then desired that a black absorption layer be positioned on the side of the hologram photographic material layer 54 (with the reflection hologram 56' recorded therein) that is not opposite to the virtual opening 43".

Figure 13:
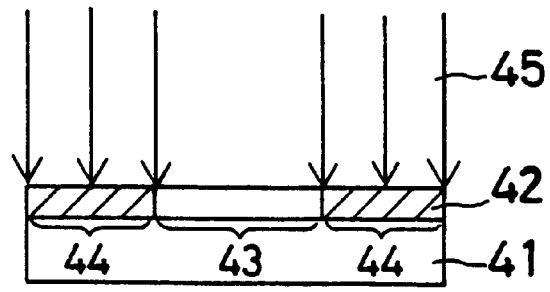
FIGS. 13(a)–13(c) are schematics illustrative of a part of the hologram display fabricating method according to another embodiment of the present invention.
Figure 13:
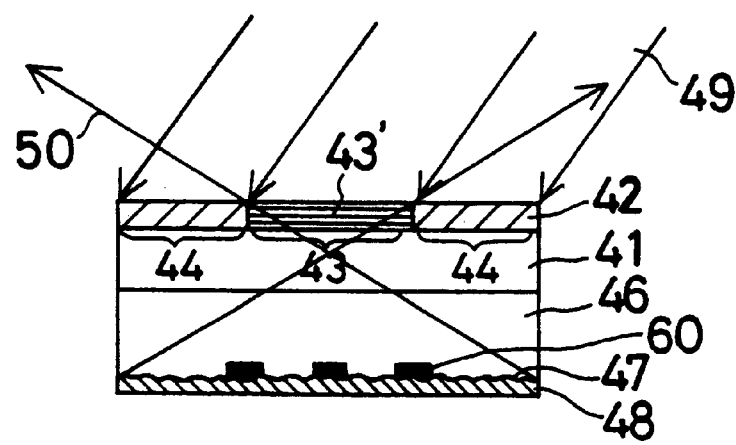
Figure 13:
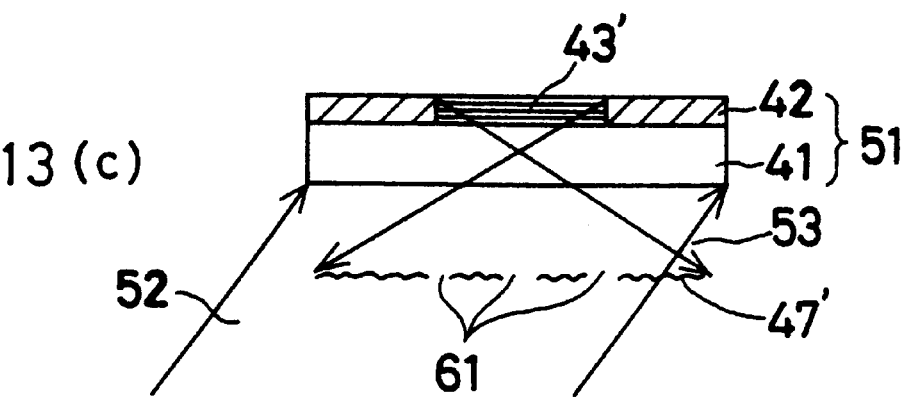

Another embodiment of the fabrication of the hologram display piece according to the present invention will now be explained with reference to FIGS. 13 and 14. As shown in FIG. 13(*a*), a volume phase type hologram photographic material layer 42 such as a photopolymer is first coated on the surface of a glass substrate 41. While an opening pattern portion 43 of the hologram photographic material layer 42 corresponding to the virtual opening pattern is left intact, an area 44 of the layer 42 except the opening pattern portion 43 is irradiated and deactivated with a light beam 45 such as an ultraviolet beam to which the hologram photographic material layer 42 is so photosensitive that it is deactivated, as is the case with FIG. 11(*a*).

Then, as depicted in FIG. 13(*b*), a reflecting scatter plate having a fine pattern is prepared by coating an absorptive coating material or the like on one roughened surface 7 of a glass plate 46 to form a fine absorbing pattern 60, and evaporating a reflective metal 48 such as aluminum all over the roughened surface 47 through the fine pattern 60 to construct a portion of the roughened surface 47 except the absorptive fine pattern 60 in the form of a reflecting scatter surface 47. Subsequently, the opposite surface of the reflecting scatter plate that is not opposite to the glass plate 46 is brought into close contact with the back surface of the glass substrate 41. In this state, a recording light beam 49 is incident on the hologram photographic material layer 42 at a given angle. The light beam 49 passes through the areas 43 and 44 of the hologram photographic material layer 42, goes straightforward through the glass substrate 41 and glass plate 46, and reaches the reflecting scatter surface 47. Light 50 reflected and scattered at the surface 47 and the light beam 49 interfere in the opening pattern 43 in the hologram photographic material layer 42 to form a reflection hologram 43'.

As shown in FIG. 13(*c*), light 52 traveling in a direction opposite to the traveling direction of the recording light beam 49 is incident from the opposite (back) side of the thus fabricated original plate 51 (consisting of the glass substrate 41 and the hologram photographic material layer 42 composed of the hologram-recorded area 43 and the deactivated area 44) on the reflection hologram 43' thereof, so that light 53 reflected and diffracted by the reflection hologram 43' can have action on forming an image 47' of the reflecting scatter surface 47 at a position where the reflecting scatter surface 47 was originally located. It is noted that the image 47' of the reflecting scatter surface 47 forms a blank area because the diffracted light 53 does not enter a pattern area 61 corresponding to the original absorptive fine pattern 60.

Figure 14A:
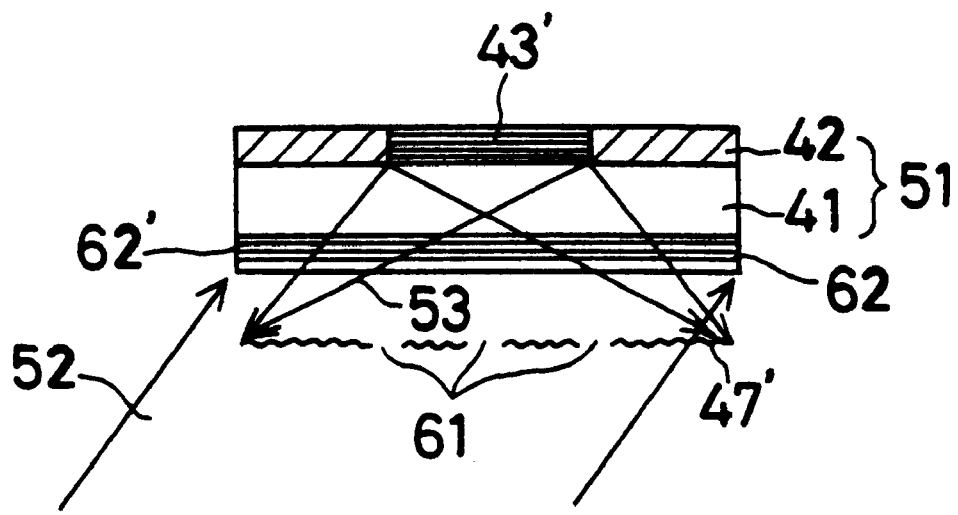
FIGS. 14(a) and 14(b) are schematics illustrative of another part of the hologram display fabrication method according to the second embodiment of the present invention.
Figure 14B:
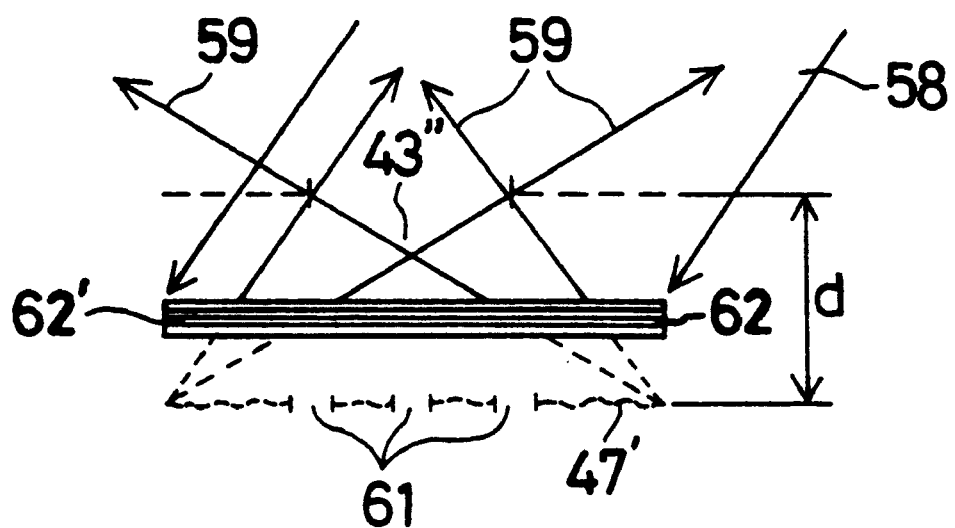

Then, as depicted in FIG. 14(*a*), another volume phase type hologram photographic material layer 62 is coated on the back surface of the glass substrate 41 opposite to the hologram photographic material layer 42 of the original plate 51. For replication, light 52 traveling in a direction opposite to the traveling direction of the recording light beam 49 is incident on the hologram photographic material layer 62. As explained with reference to FIG. 13(*c*), light 53 reflected and diffracted by the reflection hologram 43' travels in such a way that an image 47' of the reflecting scatter surface 47 is formed at a position where the reflecting scatter surface 47 was originally located. However, since the hologram photographic material layer 62 is located on the optical axis, the light 53 interferes with the incident light 52 to form a reflection hologram 62'.

The hologram photographic material layer 62 with the hologram 62' recorded therein is then separated from the original plate 51. Upon the incidence on the surface side (where the original hologram photographic material layer 42 was located) of light 58 traveling in a direction opposite to the traveling direction of the recording light 52, as depicted in FIG. 14(*b*), the reflection hologram 62' of the hologram photographic material layer 62 gives out diffracted light 59. This light 59 is diffracted as if it was emitted from the position of the image 47' of the reflecting scatter surface 47. In addition, the diffracted light 59 passes through only an area where the reflection hologram 43' was present at the time of such replication as shown in FIG. 14(*a*), so that it can travel on the same optical path as is the case where an opening 43" is present at a position of the original reflection hologram 43', resulting in the creation of a virtual opening pattern shown again at 43". Any diffracted light is not emitted from the pattern area 61 of the image 47' of the reflecting scatter surface 47 corresponding to the fine pattern 60. Thus, when the observer sees the hologram photographic material layer 62 in the direction of the diffracted light 59, he can see the fine pattern 61 hidden behind the small virtual opening 43" like a keyhole. Also, since the virtual opening 43" is spaced away from the fine pattern 61 with a certain distance d between them, the fine pattern 61 seen through the opening 43" moves and changes upon the relative movement of the observer's visual point. In this case, too, it is desired that a black absorption layer be positioned on the side of the hologram photographic material layer 62 (with the hologram recorded therein) that is not opposite to the virtual opening 43".

While the reflecting scatter surface has been described as being obtained by the evaporation of a reflective metal such as aluminum on the roughened surface, it is understood that use may be made of other reflecting scatter surfaces, for instance, surfaces coated with white coating materials, metal plates provided with specific patterns by etching, and surfaces obtained by the repeated rounding and spreading of aluminum foils. For photo-recording, and replication purposes (FIGS. 11(*b*), 12(*b*), 13(*b*), and 14(*a*)), it is desired that the light beam (49, and 52) be incident, efficiently and without stray light, on the photographic material layer (42, 54, and 62) that is in close contact with a glass plate having an antireflection coating thereon. The absorbing fine pattern 60 shown in FIG. 13(b) may be formed on another transparent film, which may then be sandwiched between the glass substrate 41 and the glass plate 46.

A substantially similar reflection hologram 62' may be obtained by substituting for the reflecting scatter surface 47 having the absorbing fine pattern 60 thereon, shown in FIG. 13(b), a reflection hologram that is obtained by irradiating and deactivating a portion of a volume phase type hologram photographic material layer corresponding to the fine pattern 60 with ultraviolet rays or the like, as shown in FIG. 11(a), and then recording the reflection hologram on a portion of the photographic material layer other than the thus deactivated portion with light scattered from the reflecting scatter surface 47 as shown in FIG. 11(b).

It is desired that the position where the virtual opening 43" is reconstructed be a surface in the vicinity of the hologram surface, usually a surface spaced away from the hologram photographic material layer 54, and 62 by a distance of up to 5 cm, preferably 5 to 6 mm. At this surface the opening 43" is recognizable with a great aesthetic effect.

While the hologram display pieces of the present invention and how to fabricate them have been described with reference to some specific embodiments, it is understood that the present invention is not limited thereto, and so many modifications may be possible.

As can be seen from the above explanations, the hologram display piece of the present invention, and the method for fabricating the same enables a fine pattern to be seen through a small virtual opening like a keyhole. Between the virtual opening and the fine pattern there is so a certain distance that the fine pattern seen through the virtual opening can move and change upon the movement of the observer's visual point. Such action makes it possible to obtain a display piece that is difficult to forge and can easily pass judgment on whether an article having it attached thereto is true or not.

An account will now be given of embodiments of the hologram liquid crystal display timepiece according to the present invention, which comprises a reflection type diffuse hologram layer that is the volume hologram having an image of a scattering body recorded therein, to which the aforesaid hologram replicating method is applied. This timepiece is designed to be improved in visibility and aesthetic effect by use of a hologram. Embodiments of the hologram liquid crystal display timepiece of the present invention will be explained.

Figure 15A:
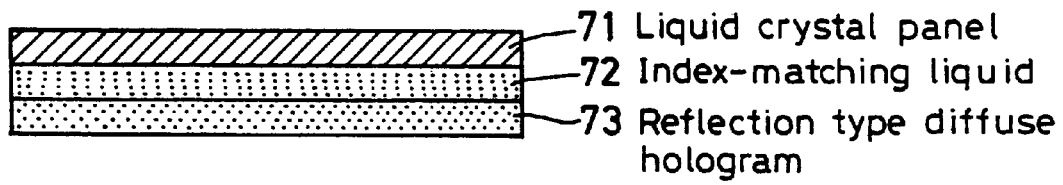
FIGS. 15(a)–15(c) are schematics illustrative of the hologram liquid crystal display timepiece according to one embodiment of the present invention.
Figure 15B:
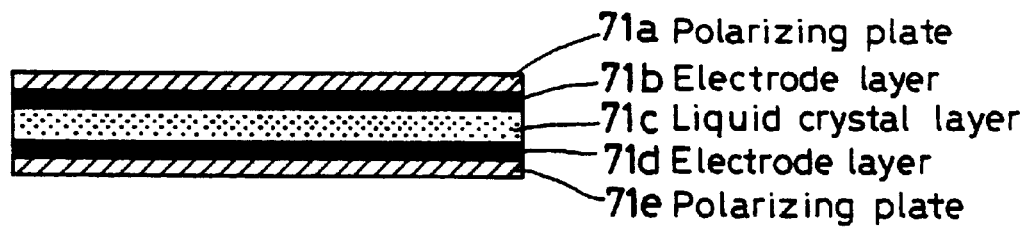
Figure 15C:
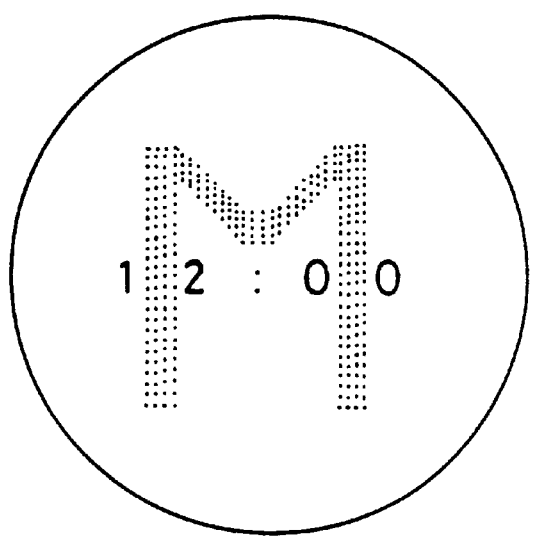
Figure 16:
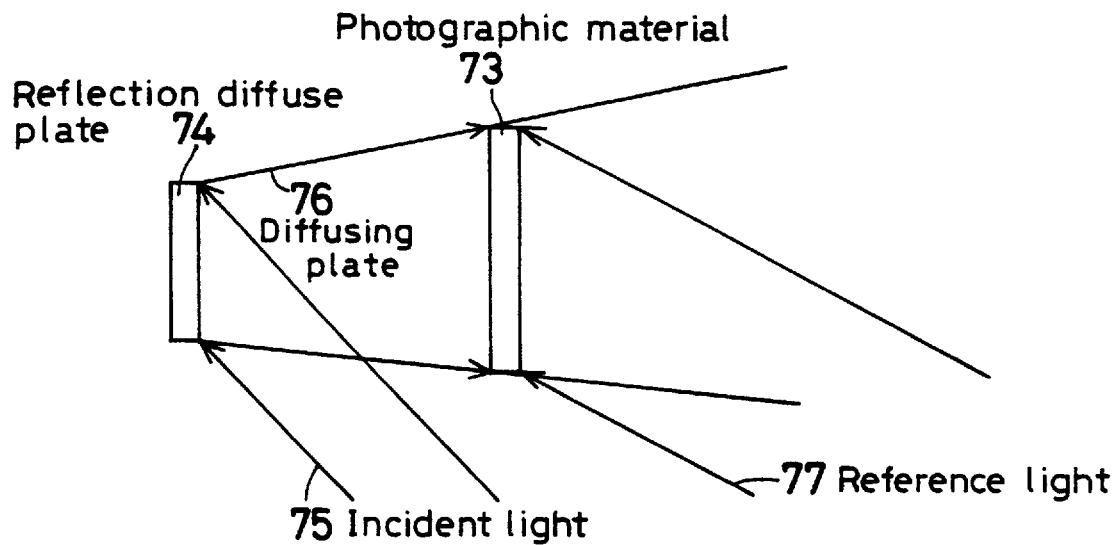
FIG. 16 is a schematic illustrative of how to fabricate a reflection type diffuse hologram.
Figure 17:
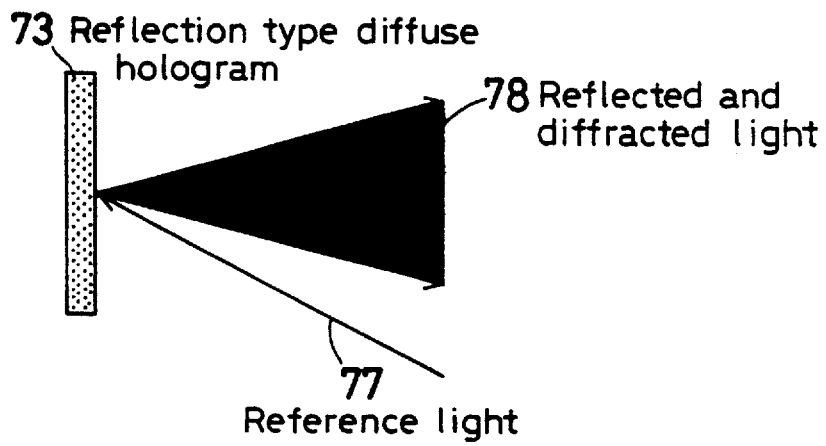
FIG. 17 is a schematic illustrative of the directivity of a reflection type diffuse hologram.

One embodiment of the hologram liquid crystal display timepiece according to the present invention is shown in FIGS. 15 to 17. FIG. 15 shows the first embodiment of the hologram liquid crystal display timepiece according to the present invention with (a) being a sectional schematic, (b) a schematic illustrative of a multilayer structure of a liquid crystal panel, and (c) a plan schematic. FIG. 16 is a schematic illustrative of how to fabricate a reflection type diffuse hologram, and FIG. 17 is a schematic illustrative of the directivity of a reflection type diffuse hologram.

In the hologram liquid crystal display timepiece, a reflection type diffuse hologram 73 is stacked on a back side of a liquid crystal panel 71 with an index-matching liquid 72 between them, as shown in FIG. 15(a). The liquid crystal panel 71 has a multilayer structure which, as can be seen from FIG. 15(b), comprises a liquid crystal layer 71c, electrode layers 71b and 71d formed on both sides of the layer 71c, and polarizing plates 71a and 71e located on the outside of the electrode layers. When voltage is applied between the electrode layers, for instance, a time display portion transmits light so that time can be indicated by light reflected and diffracted by the reflection type diffuse hologram 73, as shown in FIG. 15(c). Alternatively, a portion other than the time display portion transmits light upon voltage applied between the electrode layers, so that time can be indicated. In this case, a logotype or other mark M, if it is recorded in the form of a hologram on the reflection type diffuse hologram, may be viewed, as shown in FIG. 15(c). Such a logotype mark may be multi-recorded directly on the reflection type diffuse hologram 73. Alternatively, this mark may be recorded on another plate, which may then be stacked on the reflection type diffuse hologram 73.

In the reflection type diffuse hologram 73, fringes produced by the interference of diffusing light and reference light is recorded. To this end, a reflection diffuse plate (scatter plate) 74 and a photographic material 73 are located at a given interval, as shown in FIG. 16. Then, light 76 reflected and diffused upon the incidence of light 75 on the reflection diffuse plate 74 is directed to the back surface of the photographic material 73 while reference light 77 strikes the front surface of the photographic material 73. Upon the reflection type diffuse hologram 73 irradiated with the reference light 77, it gives out reflected and diffracted light 78 corresponding to the directivity of the diffusing light 76 shown in FIG. 15, as can be seen from FIG. 16. Therefore, if the directivity of the diffusing light 76 is such that it is in lateral offset relation to the reference light (the direction of the diffusing light deviates from the direction of light produced by the regular reflection of ambient light), it is then possible to improve visibility because the light produced by the regular reflection of ambient (reference) light does not overlap with the reflected and diffracted light. If, in this case, the reflection type diffuse hologram 73 is designed to be rotatable around the portion of the index-matching liquid 72 shown in FIG. 15(a), it is then possible to select the directivity of the reflected and diffracted light. By turning the reflection type diffuse hologram 73 depending on ambient light conditions, the timepiece can then be looked at in the absence of light produced by the regular reflection of ambient light. If, in this case, the turning of the hologram 73 is effected by use of the viscosity of the index-matching liquid 72, high visibility can be achieved with smooth turning while the reflection of light at a liquid crystal panel/reflecting layer interface is avoided.

Figure 19:
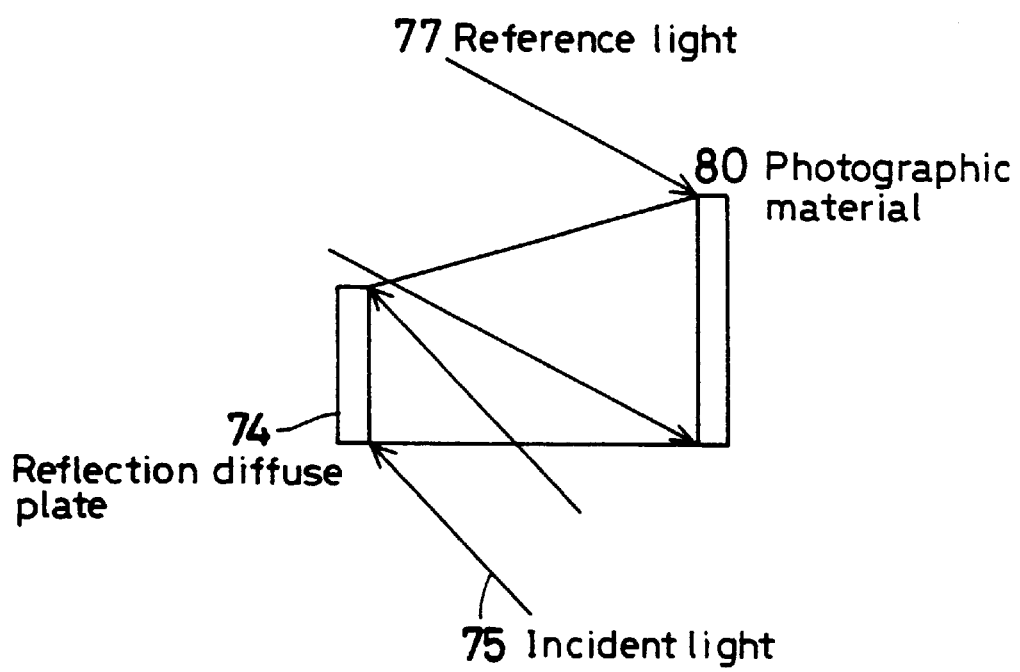
FIG. 19 is a schematic illustrative of how to fabricate a transmission type diffuse hologram.
Figure 20:
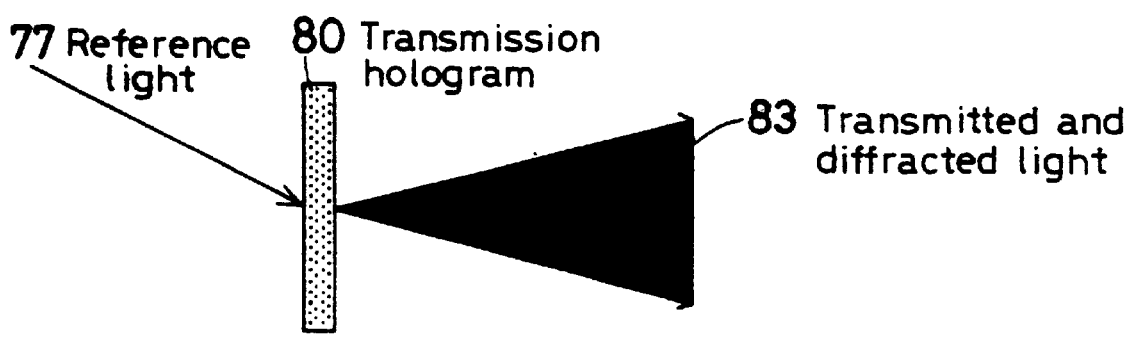
FIG. 20 is a schematic illustrative of the directivity of a transmission type diffuse hologram.

Another embodiment of the hologram liquid crystal display timepiece according to the present invention will now be explained with reference to FIGS. 18 to 20.

Figure 18:
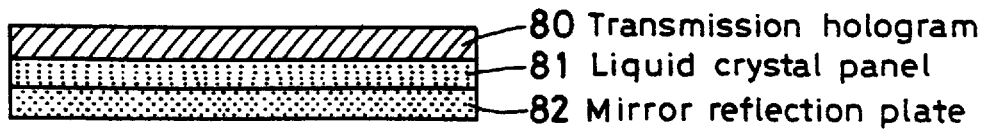
FIG. 18 is a schematic illustrative of another embodiment of the hologram liquid crystal display timepiece according to the present invention.

In this embodiment as shown in FIG. 18, a liquid crystal panel 81 is disposed on the back surface of a transmission type diffuse hologram 80, and a mirror reflection plate 82 is disposed on the back surface of the liquid crystal panel 81. The liquid crystal panel 81 has a similar multilayer structure as explained with reference to FIG. 15. Upon voltage being applied between the electrode layers, a liquid crystal portion transmits light so that time can be indicated by light passing therethrough and reflected from the mirror surface plate 82. The transmission type diffuse hologram 80 is to obtain a predetermined directivity, and is fabricated by allowing reference light 77 and light coming from a reflecting diffuse (scatter) plate 74 to interfere in the same side of a photographic material 80 to record therein the resultant interference fringes, as shown in FIG. 19. Upon the transmission type diffuse hologram 80 irradiated with ambient light (reference light 77) as shown in FIG. 20, it gives out transmitted and diffracted light in a direction that does not overlap with the direction of ambient light. Thus, the light incident through the transmission type diffuse hologram 80 on the liquid crystal panel passes through a light-transmitting portion of the liquid crystal panel, is reflected at the mirror reflection plate, and returns back through the light-transmitting portion of the liquid crystal panel and the transmission type diffuse hologram 80, so that it can be viewed while it does not overlap with light produced by the regular reflection of ambient light. In this connection, note that there is a possibility that a twin image may be formed by the rediffraction by the transmission type diffuse hologram 80 of a component of the light reflected at the mirror reflection plate and returning back through the light-transmitting portion of the liquid crystal panel, which component is in the same direction as the reference light or in conjugate relation thereto. However, such a twin image has no substantial influence because the transmission type diffuse hologram 80, liquid crystal panel 81 and mirror reflection plate are located in immediate proximity to each other. In this embodiment, too, visibility is improved by making the transmission type diffuse hologram rotatable with respect to the liquid crystal panel so that directivity can be selected depending on ambient light conditions. It is possible to make the field of view wide by using a diffuse plate in place of the mirror reflection plate. It is also possible to use a reflection type diffuse hologram in place of the mirror reflection plate.

According to the hologram liquid crystal display timepiece of the present invention as explained above, visibility can be improved because the reflection type diffuse hologram is disposed on the back surface of the liquid crystal panel or the transmission type diffuse hologram is disposed on the front surface of the liquid crystal panel, and each hologram has a lateral offset function so as to be free of light produced by the regular reflection of ambient light. A variety of aesthetic effects can also be achieved by recording logotype marks or various patterns in the holograms.

What we claim is:

1. A method for replicating an original volume hologram plate having an image of a scattering body recorded therein according to a hologram replicating technique comprising the steps of:

providing replicating illumination light incident on said original volume hologram plate at an angle of incidence $I_1$ at which a group of fringes can be replicated and recorded in a replicated hologram, said group of fringes in said replicated hologram being such that, in the vicinity of an apex defined by a slant angle $S_g$ at which said replicated hologram can be viewed at a viewing center angle $\phi$ upon illumination at an illumination angle $\theta$, a recorded intensity of said group of fringes in said replicated hologram becomes weaker more quickly at positions farther away from said slant angle $S_g$ than a recorded visual intensity of a group of fringes in said original volume hologram plate at corresponding positions away from said slant angle relative to said original volume hologram plate.

2. The method of claim 1, characterized in that the angle of incidence $I_1$ satisfies the following equation (6):

$$I_1 = \sin^{-1} \ll n_1/n_0 \times \sin\{\pm \cos^{-1}[\lambda_1/(\nu_0\lambda_0) \times \cos\{\sin^{-1}(n_0/n_1 \times \sin I_0) - \{\sin^{-1}(n_0/n_1 \times \sin\theta) + \sin^{-1}(n_0/n_1 \times \sin\phi)\}/2 - \tau_0\}] + \quad (6)$$

-continued
$$\{\sin^{-1}(n_0/n_1 \times \sin\phi) + \sin^{-1}(n_0/n_1 \times \sin\theta)\}/2 - \tau_1 \gg$$

where:

$I_0$ is an angle of incidence of reference light to record the original volume hologram plate, $\lambda_0$ is an wavelength at which the original volume hologram plate is recorded, $\nu_0$ is a degree of shrinkage of a photographic material with the original volume hologram plate recorded therein, $\tau_0$ is a slant angle change of fringes recorded in the original volume hologram plate, $\lambda_1$ is a wavelength to replicate the original volume hologram plate, $\tau_1$ is a slant angle change of replicated fringes, $n_0$ is an external refractive index of the photographic material, and $n_1$ is an internal refractive index of the photographic material.

3. A method for replicating an original volume hologram plate with a first volume hologram having an image of a first scattering body recorded therein and a second volume hologram having an image of a second scattering body recorded therein, said holograms superposed on each other, in a single volume hologram photographic material according to claim 1 or 2, comprising the steps of:

providing replicating illumination light incident on the original volume hologram plate at an angle of incidence $I_1$ at which a first group of fringes, a second group of fringes, and at least one additional similar group of fringes can be replicated and recorded in a replicated hologram;

said first group of fringes being such that, in the vicinity of an apex defined by a first slant angle $S_{g1}$ at which a replicated hologram can be viewed at a first viewing center angle $\phi_1$ upon illumination at an illumination angle $\theta$ with respect to the hologram image of the first scattering object, wherein a recorded intensity of said first group of fringes becomes weaker at a position farther away from the slant angle $S_g$ than a recorded intensity of a corresponding first group of fringes in said original volume hologram; and said second group of fringes being such that, in the vicinity of an apex defined by a second slant angle $S_{g2}$ at which the replicated hologram can be viewed at a second viewing center angle $\phi_2$ different from the first viewing center angle $\phi_1$ upon illumination at the illumination angle $\theta$ with respect to the hologram image of the second scattering object, a recorded intensity of said second group of fringes becomes weaker at a position farther away from said slant angle $S_{g2}$ than a recorded intensity of a corresponding second group of fringes in said original volume hologram.

4. A method for replicating an original volume hologram plate with a first volume hologram having an image of a first scattering body recorded therein at a first wavelength and a second volume hologram having an image of a second scattering body recorded therein at a second wavelength, said holograms superposed on each other, in a single volume hologram photographic material according to claim 1 or 2 comprising the steps of:

providing replicating illumination light incident on the original volume hologram plate at an angle of incidence $I_1$ such that a first group of fringes, a second group of fringes, and at least one similar group of fringes can be replicated and recorded in a replicated hologram, said first group of fringes being such that, in the vicinity of an apex defined by a first slant angle $S_g$ at which said replicated hologram can be viewed at a viewing center angle $\phi$ upon illumination at an illumination angle $\theta$ with respect to the hologram image of the first scattering body using third illumination light having a constant wavelength ratio relation to the first wavelength, a recorded intensity of said first group of fringes becomes weaker at a position farther away from the slant angle $S_g$ than a recorded intensity of a corresponding first group of fringes in said original volume hologram; and said second group of fringes being such that, in the vicinity of an apex defined by the same slant angle $S_g$ at which the replicated hologram can be viewed at the same second viewing center angle $\phi$ upon illumination at an illumination angle $\theta$ with respect to the hologram image of the second scattering object using fourth illumination light having again a constant wavelength ratio relation to the second wavelength, a recorded intensity of said second group of fringes becomes weaker at a position farther away from the same slant angle $S_g$ than a recorded intensity of a corresponding second group of fringes in said original volume hologram.

5. A method for replicating a volume hologram with an image of a scattering body recorded therein by a two-stage hologram replicating process comprising the two steps of:

a first stage of illuminating a hologram to be replicated with illumination angle $\theta_x$ in one direction of two directions perpendicular to a surface of said hologram and replicating illumination light is incident on said hologram at an angle of incidence $I_{1x}$ at which a fringe can be recorded by replication, said fringe having a slant angle $S_{gx}$ at which said hologram can be observed at observation center angle $\phi_x$; and a second state of illuminating said hologram to be replicated with illumination angle $\theta_y$ in the other direction of two directions perpendicular to the surface of said hologram and replicating illumination light is incident on said hologram at an angle of incidence $I_{1y}$ at which a fringe can be recorded by replication, said fringe having a slant angle $S_{gy}$ at which said hologram can be observed at observation center angle $\phi_y$, wherein $I_{1x}$ and $I_{1y}$ respectively satisfy the equation:

$$I_1 = \sin^{-1}\langle\langle n_1/n_0 \times \sin\langle \pm\cos^{-1}[\lambda_1/(\nu_0\lambda_0) \times \\ \cos\{\sin^{-1}(n_0/n_1 \times \sin I_0) - \{\sin^{-1}(n_0/n_1 \times \sin\theta) + \\ \sin^{-1}(n_0/n_1 \times \sin\phi)\}/2 - \tau_0\}] + \\ \{\sin^{-1}(n_0/n_1 \times \sin\phi) + \sin^{-1}(n_0/n_1 \times \sin\theta)\}/2 - \tau_1\rangle\rangle$$

where:

$I_0$ is an angle of incidence of reference light to record the original volume hologram plate, $\lambda_0$ is a wavelength at which the original volume hologram plate is recorded, $\nu_0$ is a degree of shrinkage of a photographic material with the original volume hologram plate recorded therein, $\tau_0$ is a slant angle change of fringes recorded in the original volume hologram plate, $\lambda_1$ is a wavelength to replicate the original volume hologram plate, $\tau_1$ is a slant angle change of replicated fringes, $n_0$ is an external refractive index of the photographic material, and $n_1$ is an internal refractive index of the photographic material.

6. A volume hologram characterized in that said volume hologram is fabricated by the replication method of any one of claims 1, 2, or 5.

7. A volume hologram characterized in that said volume hologram is fabricated by the replication method of claim 3.

8. A volume hologram characterized in that said volume hologram is fabricated by the replication method of claim 4.

* * * * *